United States Patent
Tatarchuk et al.

(10) Patent No.: US 8,425,763 B2
(45) Date of Patent: Apr. 23, 2013

(54) PROCESSES FOR REMOVING SULFUR FROM A HYDROCARBON STREAM UTILIZING SILVER-BASED SORBENTS

(75) Inventors: Bruce Tatarchuk, Auburn, AL (US); Hongyun Yang, Auburn, AL (US); Sachin Nair, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 13/216,996

(22) Filed: Aug. 24, 2011

(65) Prior Publication Data
US 2012/0018351 A1  Jan. 26, 2012

Related U.S. Application Data

(62) Division of application No. 12/112,700, filed on Apr. 30, 2008, now abandoned.

(60) Provisional application No. 60/927,072, filed on May 1, 2007, provisional application No. 60/927,038, filed on May 1, 2007.

(51) Int. Cl.
  *C10G 25/00* (2006.01)
(52) U.S. Cl.
  USPC ............ 208/246; 502/102; 502/347; 502/350
(58) Field of Classification Search ...... 208/208 R–246; 502/102, 347, 350
  See application file for complete search history.

(56) References Cited

U.S. PATENT DOCUMENTS

| | | |
|---|---|---|
| 2,261,586 A | 11/1941 | McGrath |
| 2,768,986 A | 10/1956 | Johnson et al. |
| 2,791,540 A | 5/1957 | Kimberlin, Jr. et al. |
| 3,971,712 A | 7/1976 | Miller |
| 4,188,285 A | 2/1980 | Michlmayr |
| 4,313,820 A | 2/1982 | Farha, Jr. et al. |
| 4,430,205 A | 2/1984 | Felsky |
| 4,455,286 A | 6/1984 | Young et al. |
| 4,582,819 A | 4/1986 | Miller et al. |
| 4,729,889 A | 3/1988 | Flytani-Stephanopoulos et al. |
| 4,738,771 A | 4/1988 | Miller et al. |
| 4,933,159 A | 6/1990 | Nowack et al. |
| 5,077,261 A | 12/1991 | Schubert |
| 5,102,745 A | 4/1992 | Tatarchuk et al. |
| 5,130,288 A | 7/1992 | Delzer et al. |
| 5,177,050 A | 1/1993 | Schubert |

(Continued)

FOREIGN PATENT DOCUMENTS

| | | |
|---|---|---|
| EP | 1839743 | 10/2007 |
| WO | 0208160 | 1/2002 |
| WO | 2006068135 | 6/2006 |

OTHER PUBLICATIONS

Antimatay et al., "Novel Supported Sorbents for Hot Gas Desulfurization", Environ. Sci. Technol., 1993, 27:1295-1303.

(Continued)

*Primary Examiner* — Brian McCaig
(74) *Attorney, Agent, or Firm* — Andrus, Sceales, Starke & Sawall, LLP

(57) ABSTRACT

Disclosed are sorbent compositions that include a porous titanium dioxide support impregnated with a silver material. The sorbent compositions may be utilized in systems and methods for removing sulfur compounds from hydrocarbon streams such as jet fuel.

21 Claims, 13 Drawing Sheets

U.S. PATENT DOCUMENTS

| | | | |
|---|---|---|---|
| 5,254,516 | A | 10/1993 | Gupta et al. |
| 5,700,439 | A | 12/1997 | Goyette et al. |
| 5,710,089 | A | 1/1998 | Khare |
| 6,150,300 | A | 11/2000 | Khare et al. |
| 6,271,173 | B1 | 8/2001 | Khare |
| 6,350,422 | B1 | 2/2002 | Khare et al. |
| 6,399,530 | B1 | 6/2002 | Chen et al. |
| 6,437,206 | B1 | 8/2002 | Meyer et al. |
| 6,531,052 | B1 | 3/2003 | Frye et al. |
| 6,635,600 | B1 | 10/2003 | Kimble et al. |
| 6,683,024 | B1 | 1/2004 | Khare et al. |
| 7,148,389 | B2 | 12/2006 | Yang et al. |
| 7,341,977 | B2 | 3/2008 | Klabunde et al. |
| 7,427,581 | B2 | 9/2008 | Khare |
| 2002/0008160 | A1 | 1/2002 | Martin |
| 2002/0041842 | A1 | 4/2002 | Ruettinger et al. |
| 2003/0032555 | A1 | 2/2003 | Dodwell |
| 2003/0118495 | A1* | 6/2003 | Khare et al. ............ 423/244.01 |
| 2003/0183801 | A1 | 10/2003 | Yang et al. |
| 2003/0183802 | A1 | 10/2003 | Price et al. |
| 2004/0048743 | A1 | 3/2004 | Malandra et al. |
| 2004/0140244 | A1 | 7/2004 | Sughrue et al. |
| 2004/0260139 | A1 | 12/2004 | Klabunde et al. |
| 2005/0263441 | A1 | 12/2005 | Antonio et al. |
| 2006/0081499 | A1 | 4/2006 | Khare |
| 2006/0166809 | A1 | 7/2006 | Malek et al. |

OTHER PUBLICATIONS

Babich et al., "Science and technology of novel processes for deep desulfurization of oil refinery streams: a review", Fuel, 2003, 82:607-631.

Baird et al., "Modified Zinc Oxide Absorbents for Low-Temperature Gas Desulfurization", J. Chem. Soc. Faraday Trans., 1992, 88:3375-3382.

Bakker et al., "A High Capacity Manganese-Based Sorbent for Regenerative High Temparute Desulfurization with Direct Sulfur Production: conceptual process application to coal gas cleaning", Chem. Eng. J., 2003, 96:223-235.

Barsoum, Fundamentals of Ceramic, Series in Materials Science and Engineering, 1st Ed., 2002, 136-171.

Ben-Slimane et al., "Desulfurization of Hot Coal-Derived Fuel Gases with Manganese-Based Regenerable Sorbents", Energy & Fuels, 1994, 8:1175-1183.

Borchert et al., "The effect of oxygen ion conductivity of catalysts for their performance in the oxidative coupling of methane", Preprints-American Chemical Society, Division of Petroleum Chemistry, 1992, 37:111-116.

Chang et al., "Facile Regeneration Vitreous Microfibrous Entrapped Supported AnO Sorbent with High Contacting Efficiency for Bulk H2S Removal from Reformate Streams in Fuel Cell Applications", Journal of Materials Engineering and Performance, 2006, 439-441.

Cheng et al., "Chemical properties of anion vacancies on zinc oxide", Surface Science, 1981, 102:L21-L28.

Dantsig et al., "Effect of the method of copper oxide addition on chemisorption properties of zinc-containing sulfur-purification materials", Zhurnal Prikladnoi Khimii, 1988, 61:1240-1246.

Davidson et al., "Kinetics of the Absorption of Hydrogen Sulfide by High Purity and Doped High Surface Area Zinc Oxide", Ind. Engl. Chem. Res., 1995, 34:2981-2989.

Gangwal et al., "Testing of Novel Sorbents for H2S Removal from Coal Gas", Environ. Prog., 1989, 8:26-32.

Gasper-Galvin et al., "Zeolite-supported metal oxide sorbents for hot gas desulfurization", Ind. Engl. Chem. Res., 1998, 37:4157-4166.

Grindley et al., "Development and Testing of Regenerable Hot Coal-Gas Desulfurization Sorbents", DOE/MC, 1981, 16545-1125.

Gupta et al., "Development of zinc ferrite sorbents for dsulfirization of hot coal gas in fluid-bed reactor", Energy & Fuels, 1992, 6:21-27.

Harris et al., "Wet layup and sintering of metal-containing microfibrous composites for chemical processing opportunities", Composites, Part A, 2001, 32:1117-1126, 1119, Figure 3B.

Harrison et al., "Reaction between H2S and Zinc Oxide-Titanium Oxide Sorbents", Single Pellet Sulfidation Modeling, Ind. Engl. Chem. Res., 1990, 29:1167-1172.

Hatori et al., "Role of TiO2 on oxidative regeneration of spent high-temperature desulfurization sorbent ZnO-TO2", Ind. Engl. Chem. Res., 2001, 40:1884-1890.

Hernandez-Maldonado et al., "Desulfurization of transportation fuels by π-complexation sorbents: Cu(I)-, Ni(II)-, and Zn(II)-ziolites", Appl. Catal. B: Environ, 2005, 56:111-126.

Hernandez-Mandonado et al., "Desulfurization of commercial jet fuesl by adsorption via π-complexation with vapor phase ion exchanged Cu(I)-Y zeolites", Ind. Engl. Chem. Res., 2004, 43:6142-6149.

Hernandez-Maldonado et al., "Desulfurization of transportation fuels by π complexation with Cu(I)=Y and Ag-Y zeiolites", Ind. Engl. Chem. Res., 2003, 42:123-129.

Jothimurugensan et al., "Regeneration of zinc titanate H2S Sorbents", Ind. Engl. Chem. Res., 1998, 37:1929-1933.

Jun et al., "A study of Zn-Ti-based H2S removal sorbents promoted with cobalt oxides", Ind. Engl. Chem. Res., 2002, 41:3547-3556.

Ko et al., "The sorption of hydrogen sulfide from hot syngas by metal oxides over supports", Chemosphere, 2005, 58:467-474.

Kyotani et al., "High-temperature desulfurization reaction with Cu-containing sorbents", Environ. Sci. Technol., 1989, 23:218-223.

Lew et al., "Sulfidation of zinc titanate and zinc oxide solids", Ind. Engl. Chem. Res., 1992, 31:1890-1899.

Lew et al., "High-temperature H2S removal from fuel gases by regenerable zinc oxide-titanium dioxide sorbents", Ind. Engl. Chem. Res., 1989, 535-541.

Li et al., "Cu-Cr-O and Cu-Ce-O regenerable oxide sorbents for hot gas desulfurization", Ind. Engl. Chem. Res., 1997, 36:187-196.

Lu et al., "Microfibrous entrapped ZnO-supported sorbents for high contacting efficiency H2S removal from reformate streams in PEMFC application", ACS Symposium Series, Microreactor Technology and Process Intesification, 2005, 914:406-422.

Mojtahedi, "HaS removal from coal gas at elevated temperature and pressure in fluidized bed with zinc titanate sorbents", Energy & Fuels, 1995, 9:782-787.

Nair et al., "Advanced adsorbents for ultra deep desulfurization of logistic fuels using micro-fiber entrapped particles", AICHE Annual Meeting, 2007.

Nair et al., "Selectivity and reactivity of Ag based adsorbents during desulfurization of logistic fuels", AICHE Annual Meeting, 2007.

Perego et al., Catalysis Today, 1997, 34:281-305.

Pineda et al., "Performance of zinc oxide based sorbents for hot coal gas desulfurization in multicycle tests in a fixed-bed reactor", fuel, 2000, 79:885-895.

Priyanka et al., "Promoted ZnO sorbents for low temperature H2S removal: Influence of temperature, support, surface area, pore volume and pore size", AICHE Spring National Meeting, http://aiche.confex.com/aiche/s08/techprogram/P11436.htm, Apr. 6, 2008.

Sasaoka et al., "Modification of ZnO-TiO2 high-temperature desulfurization sorbent by ZrO2 additionl", Ind. Engl. Chem. Res., 1999, 38:958-963.

Simanek et al., "Hydrogen sulfide removal by zinc oxide", Sbornik Vysoke Skoly Chemicko-Technologicke v Praze, D: Technologie Paliv, 1976, D31:437-483.

Slimane et al., "Regenerable mixed metal oxide sorbents for coal gas desulfurization at moderate temperature", Adv. Environ. Res., 2000, 147-162.

Tamhankar et al., "Mixed-Oxide sorbents for high-temperature removal of hydrogen sulfide", Ind. Engl. chem. Process. Des. Dev., 1986, 25:429-437.

Wang et al., "Derived alumina-supported copper oxide sorbent for flue gas desulfurization", Ind. Engl. Chem. Res., 1998, 37:4675-4681.

Woods et al., "Reaction between H2S and zinc oxide-titanium oxide sorbents", Ind. Engl. Chem. Res., 1990, 29:1160-1167.

Woods et al., "Kinetics of the reactions of a zinc ferrite sorbents in high-temperature coal gas desulfurization", Ind. Engl. Chem. Res., 1991, 30:100-107.

Xue et al., "Screening of adsorbents for removal of H2S at room temperature", Green Chem, 2003, 5:529-534.

Yang et al., "Doped ZnO Sorbents for H2S Removal with High Capacity and Wide Temperature Characteristics", AICHE Annual Meeting, Nov. 12, 2006.

Yang et al., "Doped ZnO Sorbents for H2S Temperature Characteristics", AICHE Annual Meeting, http://www.eng.auburn.edu/center/microfibrous/AICHE2006/AICHE2006-2.pdf, Nov. 23, 2006.

Yang et al., Novel doped zinc oxide sorbents for regenerable desulfurization applications at ambient conditions, AICHE Annual Meeting, http://aiche.confex.com/aiche/2007/techprogram/P97562.htm, Nov. 4, 2007.

Yang, "Gas phase desulfurization using regenerable microfibrous entrapped metal oxide based sorbents for logistic PEM fuel cell applications", http://graduate.auburn.edu/fpdb/auetd/YANG_HONGYUN_44.pdf, Aug. 4, 2007.

Zhang et al., "A study on regeneration of Mn—Fe—Zn—O supported upon Al2O3 sorbents for hot gas desulfurization", Fuel Proc. Technol., 2003, 84:217-227.

* cited by examiner

PROCESSES FOR REMOVING SULFUR FROM A HYDROCARBON STREAM UTILIZING SILVER-BASED SORBENTS

CROSS-REFERENCE TO RELATED APPLICATIONS

This application is a divisional of U.S. application Ser. No. 12/112,700, filed Apr. 30, 2008, which application was published on Nov. 20, 2008, as publication no. US2008/0283446, now abandoned, and claims the benefit of priority under 35 U.S.C. §119(e) to U.S. provisional application nos. 60/927,072, filed on May 1, 2007; and 60/972,038, filed on May 1, 2007; the contents of which are incorporated by reference herein in their entireties.

STATEMENT REGARDING FEDERALLY SPONSORED RESEARCH OR DEVELOPMENT

This invention was made with U.S. Government Support from the following agency: U.S. Navy, Grant Nos. NAVY-N00014-06-10143 and NAVY-N00014-06-11165. The U.S. Government has certain rights in the invention.

BACKGROUND

The field of the invention relates to sorbents that may be utilized in desulfurization processes. In particular, the field of the invention relates to porous titanium dioxides that are impregnated with silver material.

The removal of sulfur compounds from hydrocarbon streams is an important part of petroleum refining operations. Sulfur is both an environmental pollutant when the hydrocarbon streams are utilized as a fuel for combustion as well as a poison for several catalytic materials when used in electrochemical systems such as a fuel cell.

The hydrodesulfurization (HDS) process is a widely used refining technique for the removal of sulfur compounds. However, HDS technology requires hydrogen gas, high pressures, and high temperatures, thus making the process energy intensive.

Adsorption of sulfur components from fuels is an alternative technique using sulfur-specific compositions such as molecular sieves or activated alumina as adsorbent materials for removing sulfur components from liquid hydrocarbon streams. The technique has several advantages over HDS, for example, where adsorption may be carried out at room temperature and atmospheric pressures. Furthermore, multiple cycles of adsorption and regeneration are possible using some of these adsorbents. (See, e.g., U.S. Pat. Nos. 7,148,389 and 6,531,052). Although HDS is effective in removing a large portion of the sulfur content in petroleum, some heavy heterocycles are not effectively removed, primarily due to the inactivity of the HDS catalyst towards these sulfur heterocyclic atoms. Adsorptive desulfurization is capable of removing these molecules selectively from liquid fuels. (See, e.g., U.S. Pat. Nos. 7,341,977 and 2,261,586). The adsorption may be carried out at ambient conditions of temperature and pressure without using any hydrogen. Thus, there may be substantial savings in operation cast for adsorptive systems over conventional HDS systems in some applications.

The affinity of silver for sulfur is evident from the process by which silver tarnishes, adsorbing hydrogen sulfide and other sulfur compounds from the ambient air to form a layer of sulfides on its surface. Silver metal has been utilized for the removal of sulfur in the prior art. (See, e.g., U.S. Pat. Nos. 4,188,285; 3,971,712; and 2,768,986). Sorbents having silver oxide supported on activated carbon, gamma alumina, or silica have been suggested for the removal of sulfur compounds from hydrocarbon streams. (See, e.g. U.S. Pat. No. 6,531,052; U.S. Pat. No. 4,738,771; U.S. Pat. No. 2,791,540). U.S. Pat. No. 6,271,173 and U.S. Published Application No. 20030183802 disclose a desulfurizing sorbent that may include reduced silver (among other metals) as an active desulfurizing agent supported on zinc oxide, silica, or alumina.

U.S. Pat. No. 4,430,205 describes the use of silver nitrate alone as the active sulfur removal component. However, silver nitrate may not be stable when used with complex fuels, and it is not possible to regenerate this composition in air due to nitrate decomposition. Furthermore, the preparation process disclosed in this patent takes more than eighteen hours. U.S. Pat. No. 4,582,819 describes the use of silver carbonate as an active sulfur removing component supported on alumina. The preparation process disclosed in this patent utilizes a mulling process which requires heating and forming a mixture of the carbonate precursor with the alumina powder, followed by palletizing, drying and calcining. This process is long and energy intensive and renders this composition very tedious to prepare on a large scale.

Clearly, better sorbent compositions, systems, and methods for removing sulfur compounds from hydrocarbon streams are desirable.

SUMMARY

Disclosed are sorbent compositions that comprise a porous titanium dioxide support impregnated with a silver material. The titanium dioxide support may comprise porous titanium dioxide particles.

In some embodiments, the sorbent compositions comprise porous titanium dioxide particles impregnated with a silver material, where the impregnated particles include about 80-99.9% titanium dioxide (w/w) and about 0.1-20% silver material (w/w). Preferably, the particles comprise about 90-99.9% titanium dioxide (w/w) and about 0.1-10% silver material (w/w) (more preferably about 95-99.9% titanium dioxide (w/w) and about 0.1-5% silver material (w/w), even more preferably about 96-99.9% titanium dioxide (w/w) and about 0.1-4% silver material (w/w), or about 97-99.9% titanium dioxide (w/w) and about 0.1-3% silver material (w/w)).

The titanium dioxide support may be impregnated with silver material selected from a group consisting of silver metal, silver oxide, silver salt (e.g., silver nitrate), or combinations thereof. Preferably, the sorbent composition comprises silver metal, silver oxide, or a combination thereof. The silver material may be in a microcrystallite form, a nanocrystallite form or both (preferably a nanocrystallite form).

The titanium dioxide support may be in the form of porous particles, powder, grains, pellets, extrudates, or combinations thereof. Preferably, the titanium dioxide support comprises particles having a pore diameter of about 0.1-100 nm (more preferably a pore diameter of about 1-20 nm) and a pore volume of about 0.1-3.0 cc/g. Preferably, the titanium dioxide support has a relatively high surface area (e.g., greater than about 100 $m^2/g$ or within the range of about 100-1000 $m^2/g$). The titanium dioxide support is relative small in size. Preferably, the titanium dioxide support comprises particles having an average diameter of about 30-6000 microns (more preferably having an average diameter of about 30-3000 microns, about 250-2000 microns, or about 850-1400 microns). In some embodiments, the titanium dioxide support comprises particles having an average diameter of about 20-250 microns (preferably having an average diameter of about 50-100 microns).

The sorbent composition comprises titanium dioxide as a support material. In some embodiments, the sorbent composition comprises an additional support material. Additional support materials may include silicon dioxide, aluminum oxide, and activated carbon. The sorbent composition may be prepared by dispersing titanium dioxide (or a pre-cursor thereof such as titanium isopropoxide) on the additional support material (e.g., silicon dioxide) and then subsequently impregnating the dispersed titanium dioxide with the silver material.

The sorbent composition may comprise dopants. For example, the silver material may be doped with a dopant selected from a Group VIII metal or an oxide thereof. Preferably, the ratio of silver material to dopant in the sorbent composition may be about (7-3):1.

Also disclosed are filters, filter material, filter media, and filtering systems that comprise the presently disclosed sorbent compositions. As disclosed herein, a filter material may comprise the presently disclosed sorbent compositions entrapped in a matrix of fibers. A filter material may comprise the presently disclosed sorbent compositions bonded to a matrix of fibers (e.g., via a sintering process). Preferably, the fibers are ceramic fibers, cellulose fibers, metal fibers, polymer fibers or a mixture thereof. The fibers may be microfibers or nanofibers. Preferably, the fibers have an average diameter of about 2-20 microns and the entrapped or bonded composition comprises particles having an average diameter of about 20-250 microns (preferably having an average diameter of about 50-100 microns). As disclosed herein, a fibrous entrapped sorbent composition may be utilized as a polishing filter.

Also disclosed are methods for preparing the disclosed sorbent compositions. The methods may include: (a) impregnating porous titanium dioxide particles with a volume of a silver precursor solution to provide wet impregnated particles (optionally, where the volume of silver precursor solution is no more than the pore volume of the titanium dioxide particles); (b) drying and calcining the impregnated particles. In the methods of preparation, the silver precursor solution may include a silver species that decomposes to silver metal, silver oxide, or a mixture thereof, after drying and calcining. Preferably the silver precursor solution is a silver salt solution (e.g., a silver nitrate solution, a silver acetate solution, or a mixture thereof). Preferably, the step of impregnating is performed by incipient wetness impregnating, spray impregnating, or a combination of both.

In the methods of preparation, preferably the step of drying is performed by a step selected from a group consisting of: drying at a temperature range of about 22-250° C. (or about 50-200° C.); drying in sub-atmospheric pressures of about 0.001-759 torr; and drying in the presence of flowing gas stream; and a combination thereof. Preferably, the flowing gas stream comprises a gas selected a group consisting of nitrogen, oxygen, argon, helium, and a combination thereof. The methods of preparation may include drying the particles at a temperature of less than about 100° C. (e.g., for at least about 1 hour) and then subsequently heating the dried particles to a temperature of about 100-400° C. for at least about 2 hours (e.g., to calcine the dried particles).

In the methods of preparation, preferably the step of calcining is performed by heating the dried particles to a temperature within a range of about 100-800° C. (or about 100-400° C.) for at least about 1 hour (or about 2 hours) and contacting the dried particles with an oxidizing agent. Preferably, the oxidizing agent is selected from a group consisting of air, pure oxygen, ozone, hydrogen peroxide, and a combination thereof.

Also disclosed are processes for selectively removing sulfur compounds from a stream, which may include a liquid stream, a gaseous stream, or a combination of both. The stream may include a hydrocarbon stream (e.g., a hydrocarbon fuel stream). Preferably, the process includes passing the stream through an effective amount of the disclosed sorbent composition for selectively removing sulfur compounds from the stream. The stream may be passed through the sorbent composition for a sufficient period of time to reduce sulfur compounds in the stream to a suitable level (e.g., no more than 200 ppmw, 100 ppmw, 50 ppmw, 10 ppmw, 1 ppmw, 0.1 ppmw or less).

The process may utilize a container, cartridge, or bed that encloses the sorbent composition (or that encloses a filter material that comprises the sorbent composition). In the process, the hydrocarbon stream may be passed in a direction against gravitational force (i.e., upward through the sorbent composition). The process may utilize a cartridge or container that encloses the sorbent composition, where the cartridge has a bottom and a top and the hydrocarbon stream passes into the bottom of the cartridge and exits the top of the cartridge.

After the sorbent composition has been utilized to remove sulfur compounds from a stream, the process may include removing sulfur compounds adsorbed to or retained by the sorbent composition and optionally any hydrocarbons adsorbed to or retained by the sorbent composition, thereby regenerating the sorbent composition. Preferably, the step of removing sulfur compounds adsorbed to or retained by the sorbent composition is performed by heating the sorbent composition to a temperature between about 100-900° C. (more preferably to a temperature between about 100-450° C.) and passing an oxidizing agent (e.g., air) over the sorbent composition. Where the process utilizes a cartridge or container, the step of removing sulfur compounds adsorbed to or retained by the sorbent composition may be performed by passing air over the sorbent composition in a direction from the top of the cartridge to the bottom of the cartridge (i.e., in a direction opposite to the flow of the stream through the sorbent composition). The removed sulfur compounds and optionally any retained hydrocarbons may be recovered (e.g., by collecting and condensing the removed sulfur compounds and optionally any retained hydrocarbons). The regenerated sorbent composition may have a sulfur capacity that is not substantially reduced in comparison to a sorbent composition prior to use (e.g., where the regenerated sorbent composition has a sulfur capacity that is at least about 80% of the sulfur capacity for the sorbent composition prior to use, and preferably at least about 85%, 90%, or 95% of the sulfur capacity for the sorbent composition prior to use).

DETAILED DESCRIPTION

Figure 1:
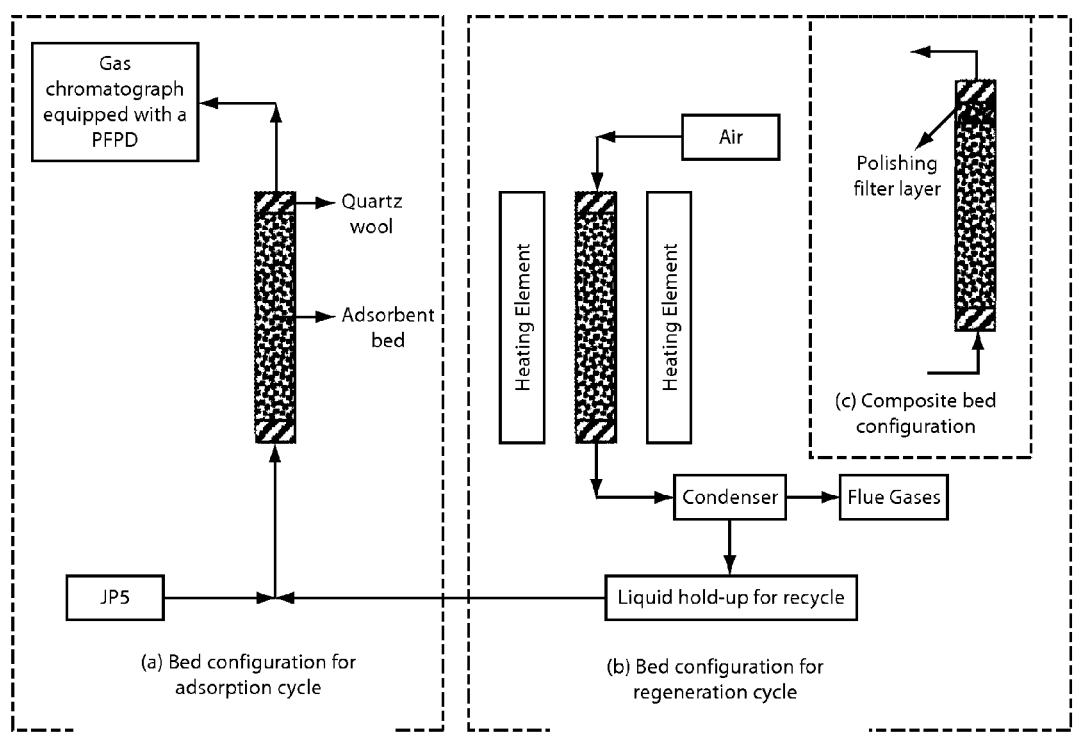
FIG. 1 provides a schematic representation of a desulfurization and regeneration process and a composite design.

The present invention is described herein using several definitions, as set forth below and throughout the application.

Definitions

Unless otherwise specified, the terms "a," "an," and "the" mean "one or more."

As used herein, "about," "approximately," "substantially," and "significantly" will be understood by persons of ordinary skill in the art and will vary to some extent on the context in which they are used. If there are uses of the term which are not clear to persons of ordinary skill in the art given the context in which it is used, "about" or "approximately" will mean up to plus or minus 10% of the particular term and "substantially" and "significantly" will mean more than plus or minus 10% of the particular term.

As disclosed herein, "silver material" may include silver metal, silver oxides, and silver salts (e.g., silver nitrate and silver acetate). Silver material may be generated in situ from a silver precursor, after drying and calcining.

As used herein, "titanium dioxide" refers to "titanium (IV) oxide" or titania, having the formula $TiO_2$. Titanium dioxide may form a porous support, such as porous particles, which may be impregnated with silver material as disclosed herein.

As used herein, "impregnation" refers to the introduction of a solution to a porous support material. In contrast to the term "coating," the term "impregnating" means that the solution has permeated the support material or that the support material has become infused with the solution. "Coating," in contrast, only indicates that a layer of the solution has been deposited on the outer surface of a support material.

As used herein, the term "incipient wetness technique" or "IWT" refers to a technique for the synthesis of heterogeneous catalysts. Typically in IWT, an active metal precursor is dissolved in an aqueous or organic solution. Then, the metal solution is added to a catalyst support, where the volume of solution added is no greater than the pore volume of the support. Capillary action draws the solution into the pores. The catalyst can then be dried and calcined to drive off the volatile components within the solution, depositing the metal on the catalyst surface.

The sorbent compositions disclosed herein may include "promoter agents." In many industrial catalyst systems, the presence of so-called catalyst promoters is essential to achieve the required activity or selectivity. A promoter may be defined as a substance that causes a more than proportional increase in activity or selectivity when added to the catalyst. The promoter alone may be completely inactive in the catalytic process, where it is used to boost productivity. A promoter may be a structural promoter or an electronic promoter. Structural promoters cause an increase in the number of active sites. Electronic promoters produce active sites with a higher intrinsic activity. Promoter agents may include metals, metal oxides, or metal oxide precursors, for example, where the metal is selected from, but is not limited to, silver, titanium, cobalt, nickel, iron, manganese, copper, molybdenum, zinc, tungsten, tin, vanadium, or mixtures thereof.

The disclosed sorbent compositions may comprise "dopants." As used herein, a dopant (in catalysis and adsorption) is an impurity added to a crystal structure (e.g., a metal such as cobalt, nickel, iron, manganese, copper, molybdenum, zinc, tungsten, tin, and vanadium) in order to alter the surface morphology of the resulting composition.

As used herein, "morphology" relates to the structure of the adsorbent surface exposed to the feed fuel/gas. The morphology is influenced by factors that include the crystal structure of silver, the nature of its dispersion on the titanium dioxide surface, and the number of exposed silver atoms. The same is applicable to the support surface The disclosed sorbent compositions may be utilized to remove sulfur compounds (i.e., "desulfurize") hydrocarbon streams, for example, jet fuels such "JP-5" and "JP-8." JP-5 or NATO F-44 is a kerosene-based fuel with a high flash point and is used where risk from fire is particularly great. JP-8 or NATO-F34 also is a kerosene-based jet fuel which has low flammability and good combat survivability. These fuels contain icing inhibitors, corrosion inhibitors and anti-static agents compared to commercial fuels such as gasoline.

As used herein, "sulfur compounds" may include sulfur, hydrogen sulfide, carbonyl sulfide (COS) and other organo-sulfur compounds such as mercaptans or those thiophenic compounds found in cracked gasolines, which include among others thiophene, benzothiophene, alkyl thiophenes, alkyl benzothiophenes and alkyldibenzothiophenes.

As used herein, "sulfur capacity" refers to the amount of total sulfur removed by the absorbent. Sulfur capacity may be defined in at least two ways: (1) "breakthrough capacity," which refers to the amount of sulfur removed when the sulfur concentration at the bed outlet just exceeds the required concentration; and (2) "saturation capacity," which refers to the amount of sulfur removed when the bed has been exhausted and cannot capture any more sulfur. Sulfur capacity may be expressed per gram of adsorbent used as a method to normalize comparisons. One method of expressing sulfur capacity is to cite as milligrams of sulfur captured per gram of adsorbent used (e.g., milligrams sulfur per gram adsorbent or "mg/g"). Preferably, the sorbent compositions disclosed herein have a relatively high sulfur capacity.

As used herein, "LHSV" refers to "Liquid Hourly Space Velocity" and is defined as (volumetric feed flow rate)/(catalyst volume). The fuel flow rates in many of the tests mentioned herein was 0.5 cc/min. The catalyst volume varied with bed weight.

As used herein, "PFPD" refers to a "Pulsed Flame Photometric Detector," which is a sulfur specific detector attached to a gas chromatograph. The instrument allows the monitoring of sulfur compounds in liquids or gases without interference by hydrocarbons and all other components in fuels. The detector utilized in the experiments disclosed herein was capable of detecting sulfur compounds at a concentration as low as 20 ppbw (parts per billion by weight). As used herein, the "split ratio technique" refers to a technique performed during PFPD analysis where a portion of the sample introduced to the gas chromatograph is purged before reaching the detector so as to reduce the signal intensity for better signal resolution.

As used herein, "breakthrough" refers to the concentration of sulfur compounds in the fuel exiting an adsorbent bed observed with the passage of time.

As used herein, "cycle" refers to a single round of adsorption and regeneration of an adsorbent bed.

As used herein, hydrodesulfurization (HDS) is a catalytic chemical process widely used to remove sulfur (S) from natural gas and from refined petroleum products such as gasoline or petrol, jet fuel, kerosene, diesel fuel, and fuel oils.

As used herein, "saturation" is the exhaustion point of an adsorption bed beyond which no further sulfur will be removed.

As used herein, "regenerability" relates to the ability of the same adsorbent to be used for multiple cycles of adsorption after stripping the adsorbed species (e.g., by air) and then to be used for subsequent cycles of adsorption. In some embodiments, the disclosed sorbent compositions do not exhibit substantially reduced sulfur capacity after regeneration in comparison to a sorbent composition that has not been previous used and regenerated (e.g., where the regenerated sorbent composition has a sulfur capacity that is at least about 80% of that of the sorbent composition that has not been previous used and regenerated, or preferably at least about 85%, 90%, or 95% of the sorbent composition that has not been previous used and regenerated).

Compositions

The presently disclosed sorbent compositions comprise a porous titanium oxide support (such as porous titanium dioxide particles) impregnated with a silver material (such as silver metal, silver oxide, or silver salt). The sorbent compositions exhibit unexpected, desirable characteristics over sorbent compositions in the prior art. For example, the disclosed sorbent compositions have a high sulfur removal capacity and are prepared easily. Furthermore, the disclosed sorbent composition may be easily regenerated for multiple operation cycles without losing substantial sulfur capacity.

Among the fifteen or more adsorbent formulations tested at Auburn University, silver supported on titanium dioxide exhibited a superior sulfur adsorption performance. This composition developed at Auburn University showed higher saturation capacity for sulfur compared to copper ion exchanged Y-type zeolite; silver supported on gamma alumina; or silver nitrate supported on alumina; as disclosed in the art. (See, e.g., U.S. Pat. Nos. 6,631,052 and 4,430,205, and U.S. Published Application No. 20030183802).

From the experimental observations on the desulfurization performance of $Ag/TiO_2$ in comparison to when silica and alumina was used as a support, it was noted that titanium dioxide had a promoting effect both with respect to capacity for removing sulfur as well as providing better stability when exposed to hydrocarbon fuels. It was also determined that the composition had better selectivity for sulfur compounds over aromatic compounds which has been observed to be a limiting factor for zeolite based adsorbents. (See, e.g., U.S. Published Application No. 2003-0183802.) Because a major fraction of common hydrocarbon fuels is aromatic, this renders the present composition advantageous for removing sulfur while keeping the composition of the original fuel intact.

In some embodiments of the presently disclosed sorbent compositions, silver or a mixture of silver and its oxides is nano-dispersed on a titanium dioxide support having a relatively high surface area. In further embodiments, a titanium dioxide support may be impregnated with a silver salt solution. Silver also may be mechanically mixed with a titanium dioxide precursor using a binder and then the resulting mixture may be processed in a pellet form. Silver also may be deposited as a monolayer on the surface of the titanium dioxide support by a thermal process. Silver also may be sputtered on the surface of titanium dioxide particles. The $Ag/TiO_2$ composition thus prepared further may be applied to an additional support material. Any high surface area material such as activated carbon, silica or alumina may be used as an additional support material. After having been applied to the additional support material, the sorbent composition may be further treated, for example, by heating or sintering.

The disclosed sorbent compositions comprise porous titanium oxide particles impregnated with a silver material. In some embodiments, the sorbent compositions further may comprise additional promoters or dopants such as copper or cesium (e.g., in order to improve dispersion and activity of silver). In further embodiments, the disclosed sorbent compositions may comprise rhenium or manganese (e.g., in order to enhance the regenerability of the composition by improving hydrocarbon combustion during regeneration).

The disclosed sorbent compositions may be utilized in filters, filter material, filter media, or filtering systems. In some embodiments, the sorbent compositions may be entrapped in glass fibrous media (GFM). GFM enables the use of small particle sizes (50-300 micron) and therefore reduce the intra-particle mass transfer resistance (mainly pore diffusion) in desulfurization and regeneration processes to improve performance. In some embodiments, the present compositions can be processed in a wet-lay process wherein the particles are entrapped in a matrix of bonded GFM.

As disclosed herein, silver and its oxides supported on titanium dioxide have been demonstrated to be an effective desulfurizing agent for complex fuels such as jet fuel (e.g., JP-5 and JP-8). Several factors make this adsorbent superior and unique to existing compositions used for the removal of sulfur compounds from liquid hydrocarbon fuels at room temperature and atmospheric pressure. The sorbent composition may have a relatively high sulfur capacity (e.g., a sulfur breakthrough capacity of at least about 2.8 mg/g at 20 ppmw (preferably at least about 3.0 mg/g at 20 ppmw, 3.2 mg/g at 20 ppmw, 3.4 mg/g at 20 ppmw, or 3.6 mg/g at 20 ppmw) or a sulfur saturation capacity based on $t_{1/2}$ of at least about 5.0 mg/g (preferably at least about 6.0 mg/g, 7.0 mg/g, or 8.0 mg/g)). In further embodiments, the sorbent composition can be regenerated in air for reuse without substantial loss in sulfur capacity (e.g., preferably where the regenerated sorbent composition maintains at least about 80%, 85%, 90%, or most preferably 95% of the sulfur capacity for the sorbent composition prior to use and regeneration). In even further embodiments, the sorbent composition may be very stable over the thermal cycling temperatures that are used for regeneration procedures compared to other compositions such as $Ag/Al_2O_3$ and $Ag/SiO_2$. In even further embodiments, the sorbent composition may be used for sulfur removal at room temperature and at atmospheric pressures. In even further embodiments, the sorbent composition may not require special storage conditions, for example, storage in an inert atmosphere or in a sulfur free solvent prior to use. In even further embodiments, the sorbent compositions may not require an activation step or a series of activation steps prior to use for removing sulfur from a hydrocarbon stream. In even further embodiments, the performance of the disclosed sorbent compositions for removing sulfur from a hydrocarbon stream is not substantially inhibited by the presence of aromatics in the stream.

Procedures for Preparation

In some embodiments, the disclosed sorbent compositions may be prepared from the following exemplary components: (1) an aqueous solution of a silver precursor (e.g., silver nitrate); and (2) a high surface area titanium dioxide as the support structure. Wet impregnation may be the technique that is used to disperse the silver on the support. A solution of the silver precursor is prepared to a determined concentration. The concentration is determined by the weight loading of Ag required on the final adsorbent/sorbent. In some embodiments, the weight loading is approximately 1-5% Ag (w/w) on the support (or 1-4% Ag (w/w) or 2-4% Ag (w/w)).

The titanium dioxide support is preferably not in a "bone-dry" condition prior to impregnation and may be in the form of pellets or particles. In some embodiments, the particle size will be between 1.4-0.85 mm. Prior to impregnation, the support may be treated with moisture saturated air for a sufficient amount of time so that 1 g of support gains approximately 3% w/w moisture loading. In some embodiments, the support is treated with saturated or super-saturated steam at a temperature of about 100-200° C. The volume of the aqueous precursor used in the impregnation step preferably may be less than or equal to the pore volume of the titanium dioxide support. The impregnation solution preferably is introduced to the support as small droplets or as a fine mist that is atomized using air or nitrogen. The resulting wet pellets or particles may be vacuum-dried at room temperature or less. The applied vacuum may be such that the drying rate is 0.05 cc/min or higher. After the drying process, the resulting composition may be calcined in air or an inert gas (e.g., at 400° C. for at least about 2 h). It may be desirable to keep the heating time to a minimum during calcination, for example, only enough heating time to ensure the conversion of the silver nitrate to metallic silver and oxides. The sorbent composition also may be dried in a conventional oven (e.g., at a temperature of at least about 100° C.) instead of in vacuum prior to calcination.

In some embodiments, a solution of silver oxide in a solvent such as lactic acid may be used as a precursor for silver and then calcined to prepare the disclosed sorbent compositions, rather than using a solution of silver nitrate. Other water soluble salts of silver can be used for the wet impregnation step such as silver acetate. In even further embodiments, a silver halide such as silver chloride may be utilized.

In some embodiments, the sorbent composition may be precipitated from a mixture of a silver precursor and a titanium dioxide precursor. The resulting composition then may be dried, calcined and palletized. In further embodiments, silver may be deposited on the support surface as a combination of metallic silver and oxides by thermal methods.

The titanium dioxide support utilized in the present methods typically has a high surface area and may be in the form of titanium dioxide particles. In some embodiments, the titanium dioxide support has a surface area of at least about 100 $m^2/g$ and typically about 100-1000 $m^2/g$. In one embodiment, the titanium dioxide support has a surface area of about 150 $m^2/g$.

The titanium dioxide support may be modified prior to impregnation or during impregnation in order to enhance the adhesion and dispersion of silver. For example, the surface charge of the titanium dioxide support may be modified by adjusting the pH of the impregnating solution. In some embodiments, the titanium dioxide support may be treated with steam to improve surface properties prior to impregnation. In further embodiments, the titanium dioxide support is treated with moisture saturated air prepared from a basic solution prior to impregnation. The titanium dioxide support may be subjected to cyclic oxidation and reduction of the titanium dioxide surface to increase crystal defects on the surface at high temperatures. In even further embodiments, the titanium dioxide support may be treated with ultra-violet radiation prior to impregnation.

The disclosed sorbent compositions may comprise support material in addition to titanium dioxide. In some embodiments, titanium dioxide may be dispersed on a high surface area support such as silica in the form of a liquid precursor such as titanium isopropoxide followed by the dispersion of silver on this mixed titanium dioxide/silica surface.

The disclosed sorbent compositions further may be utilized in filter material. In some embodiments, the disclosed sorbent compositions may be entrapped in a sinter-locked mesh of fibers and used as a polishing filter material for sulfur removal.

In further embodiments, the sorbent composition entrapped in the fiber matrix may be loaded in a reactor bed or cartridge in layers. For example, each layer of the reactor bed may comprise different filter material that specifically removes different contaminants (e.g., sulfur atoms in fuels, certain aromatics, or adsorbent poisons).

Process Conditions

The sorbent compositions may be utilized in methods for treating streams, which may include liquid streams, gaseous streams, or a combination thereof. The methods may include removing sulfur compounds from the treated streams. Streams may include hydrocarbon streams such as jet fuel.

In some embodiments, the sorbent composition may be loaded into a tubular reactor and packed to minimize the formation of void/dead spaces. The amount of sorbent composition loaded into the reactor may be adjusted based on several factors, including: the expected amount of sulfur present in the stream to be treated; the volume of the stream to be processed per pass; and the concentration of sulfur required after processing. The amount of sorbent composition loaded into the reactor also may be adjusted based on the time/temperature restrictions for the regeneration of the adsorbent bed. The stream may be passed or flowed in the reactor in a direction against the gravitational force (i.e., upward). The desulfurization process may be carried out at room temperature and atmospheric pressures. The bed may be regenerated after reaching the exhaustion point. For example, initially, high velocity air at room temp may be passed through the reactor to remove any of the residual stream in the intra-particle void space (i.e., in a "blow-down" procedure). The temperature of the inlet air then may be further raised to about 250° C. and maintained for at least 1 hour. The temperature then may be further increased to about 450° C. and maintained for at least about 2 hours. The duration for these steps may vary depending on the depth of the adsorbent bed. The bed may be used for a subsequent cycle after being allowed to cool to room temperature. Any vapors generated during the regeneration cycle maybe collected and condensed.

In further embodiments, the sorbent composition may be introduced to a vessel containing a liquid to be desulfurized. The liquid then may be agitated to achieve desulfurization. The sorbent composition then may be removed from the vessel and calcined in another vessel for reuse.

In some embodiments, desulfurization may be performed at pressures that are higher than atmospheric pressure. In further embodiments, desulfurization may be performed at temperatures that are greater or less than room temperature in order to modify the desulfurization performance. In even further embodiments, desulfurization may be performed in the presence of UV or visible light, where silver and titanium dioxide are known to exhibit photo-activity.

The sorbent composition may be packed in a reactor or a container (e.g., a cartridge). In some embodiments, the sorbent composition may be packed in the reactor in a particle size distribution. The selected distribution may reduce the liquid fuel hold-up in the interstitial void space of the reactor.

During regeneration, the temperature of the sorbent composition may be adjusted. For example, the temperature may be adjusted such that the sorbent composition emits hydrocarbon vapors that are essentially sulfur-free (e.g., where less than about 1% sulfur is present in the emitted hydrocarbon vapors). The hydrocarbon vapors thus emitted may be condensed and recovered.

The air passed over the exhausted sorbent composition (i.e., "the stripping air") may be recycled by removing the sulfur dioxide in the stripping air that is produced during regeneration. For example, the sulfur dioxide present in the stripping air may be combined with water to form sulfuric acid, which subsequently is removed by condensation.

The sorbent composition may be regenerated by the use of UV radiation. For example, the sorbent composition may be regenerated by treating the exhausted sorbent composition with UV radiation and heat.

Fibrous Entrapment

The presently disclosed sorbent compositions may be entrapped in a matrix of fibrous material (e.g., microfibrous, or nanofibrous material). In some embodiments, the presently disclosed sorbent compositions are entrapped in a sinter-locked mesh of ceramic fibers (e.g., ceramic microfibers or ceramic nanofibers). The entrapped sorbent compositions may be utilized in treatment systems such as those illustrated in FIG. 1. In some embodiments, the entrapped sorbent compositions may be utilized as polishing filter media downstream of a packed bed comprising the sorbent composition.

In some embodiments, fibrous entrapped sorbent compositions may be prepared by entrapping a titanium dioxide support in a matrix of fibers. The entrapped support then may be sintered and bonded to the matrix of fibers. The bonded support then may be impregnated with a silver precursor solution (e.g., a silver salt solution such as silver nitrate, silver acetate, and the like), dried, and calcined.

Configurations

Filtering systems that comprise layers of the disclosed sorbent compositions also are disclosed. A filtering system may include: (a) a first sorbent composition (optionally entrapped in matrix of fibers), where the first sorbent composition preferentially adsorbs a first compound (e.g., a first sulfur compound); and (b) a second sorbent composition (optionally entrapped in a matrix of fibers), where the second sorbent composition preferentially adsorbs a second compound (e.g., a second sulfur compound). The filtering system may be layered in a reactor bed or in a cartridge and may comprise a polishing filter layer. The disclosed systems may be utilized in fuel filter assemblies.

In some embodiments, the disclosed filtering systems may comprise a packed bed in a reactor or a cartridge. For example, a packed bed in a reactor or a cartridge may comprise different sorbent compositions. The different sorbent compositions may comprise different sorbent mixtures (e.g., different mixtures of copper doped zinc oxide). The different sorbent compositions may comprise different supports. The different sorbent compositions may have different particle sizes and may function optimally at different temperatures. For example, a sorbent composition with fast mass transfer characteristics (e.g., a high efficiency sorbent composition using dopants, a supported sorbent structure, a small particle size, and microfibrous entrapment) may be used as a polishing filter layer at the downstream end of a packed bed of relatively large size extrudates.

The disclosed filters, filter material, filter media, and filtering systems may utilize particle size distributions to reduce liquid retention. Liquid retention in an adsorption bed (i.e., "liquid holdup") is a common problem, especially when adsorption beds are scaled up. In the disclosed sorbent composition systems, an appropriately adjusted particle size distribution may be chosen in order to minimize liquid holdup. Liquid holdup also may be minimized by using a support having a lower pore volume and having an optimized particle size distribution. This may minimize liquid holdup without substantially affecting system performance.

Illustrative Embodiments

The following list of embodiments is illustrative and is not intended to limit the scope of the claimed subject matter.

Embodiment 1. A sorbent composition comprising porous titanium dioxide particles impregnated with a silver material, where the impregnated particles comprise about 90-99.9% titanium dioxide (w/w) and about 0.1-10% silver material (w/w).

Embodiment 2. The sorbent composition of embodiment 1, comprising about 1-10% silver material (w/w) (preferably about 1-5% silver material (w/w), about 1-4% silver material (w/w), or about 1-3% silver material (w/w)).

Embodiment 3. The sorbent composition of embodiment 1 or 2, where the silver material is selected from a group consisting of silver metal, silver oxide, silver nitrate, or combinations thereof (preferably silver metal, silver oxide, or a combination thereof).

Embodiment 4. The sorbent composition of any of embodiments 1-3, where the silver material is silver nitrate.

Embodiment 5. The sorbent composition of any of embodiments 1-4, where the silver material is in a nanocrystallite form.

Embodiment 6. The sorbent composition of any of embodiments 1-5, where the particles have a pore volume of about 0.1-3.0 cc/g (preferably about 0.5-2.0 cc/g).

Embodiment 7. The sorbent composition of any of embodiments 1-6, where the particles have a surface area of about 100-1000 $m^2/g$.

Embodiment 8. The sorbent composition of any of embodiments 1-7, where the particles have an average diameter of about 30-6000 microns (preferably where the particles have an average diameter of about 30-3000 microns, about 250-2000 microns, or about 850-1400 microns).

Embodiment 9. The sorbent composition of any of embodiments 1-7, where the particles have an average diameter of about 20-250 microns (preferably an average diameter of about 50-100 microns).

Embodiment 10. The sorbent composition of any of embodiments 1-9, where the particles have an average pore diameter of about 0.1-100 nm (preferably about 1-20 nm).

Embodiment 11. The sorbent composition of any of embodiments 1-10, where the particles are in the form of powder, grains, pellets, extrudates, or combinations thereof.

Embodiment 12. The sorbent composition of any of embodiments 1-11 dispersed on a support material selected from a group consisting of silicon dioxide, aluminum oxide, and activated carbon.

Embodiment 13. The sorbent composition of any of embodiments 1-12, where the silver material comprises a dopant selected from a Group VIII metal or an oxide thereof and the ratio of silver material to dopant in the sorbent composition is about (7-3):1.

Embodiment 14. A filter material comprising the sorbent composition of any of embodiments 1-13 entrapped in a matrix of fibers.

Embodiment 15. The filter of embodiment 14, where the sorbent composition is bonded to the matrix of fibers (e.g., via a sintering process).

Embodiment 16. The filter material of embodiment 14 or 15, where the fibers have an average diameter of about 2-20 microns and the particles have an average diameter of about 25-250 microns (preferably an average diameter of about 50-100 microns).

Embodiment 17. The filter material of any of embodiments 14-16, where the fibers are ceramic fibers.

Embodiment 18. A method for preparing the sorbent composition of any of embodiments 1-13, the method comprising: (a) impregnating porous titanium dioxide particles with a volume of silver precursor solution (e.g., silver salt solution) to provide wet impregnated particles, where the volume of silver salt solution is no more than the pore volume of the titanium dioxide particles; (b) drying the wet impregnated particles; and (c) calcining the dried particles.

Embodiment 19. The method of embodiment 18, comprising heating the wet impregnated particles to a temperature of about 100-400° C. for at least about 2 hours.

Embodiment 20. The method of embodiment 18 or 19, where the silver precursor solution is a silver salt solution selected from a group consisting of silver nitrate solution, silver acetate solution, silver chloride solution, and a mixture thereof.

Embodiment 21. The method of any of embodiments 18-20, where the step of impregnating is performed by spray impregnating, incipient wetness impregnating, or a combination of both.

Embodiment 22. The method of any of embodiments 18-21, where the step of drying is performed by a step selected from a group consisting of: drying at a temperature range of about 22-250° C. (preferably at a temperature range of about 50-200° C.); drying in sub-atmospheric pressures of about 0.001-759 torr; and drying in the presence of flowing gas stream; and a combination thereof.

Embodiment 23. The method of any of embodiment 22, where the flowing gas stream comprises a gas selected a group consisting of nitrogen, oxygen, argon, helium, and a combination thereof.

Embodiment 24. The method of any of embodiments 18-23, where the step of calcining is performed by heating the dried particles to a temperature in a range of about 100-800° C. for at least about 1 hour (preferably to a temperature in a range of about 100-450° C. for at least about 1 hour) and contacting the dried particles with an oxidizing agent.

Embodiment 25. The method of embodiment 24, where the oxidizing agent is selected from a group consisting of air, pure oxygen, ozone, hydrogen peroxide, and a combination thereof.

Embodiment 26. A process for removing sulfur compounds from a hydrocarbon stream, the process comprising passing the hydrocarbon stream through a filter material comprising an effective amount of the sorbent composition of claim 1 for a sufficient period of time to reduce sulfur compounds in the hydrocarbon stream to a level of no more than about 200 ppmw (preferably no more than about 100 ppmw, 50 ppmw, 10 ppmw, 1 ppmw, 0.1 ppmw or less).

Embodiment 27. The process of embodiment 27, where the filter material is contained within a cartridge having a bottom and a top and the hydrocarbon stream passes from the bottom of the cartridge to the top of the cartridge.

Embodiment 28. The process of embodiment 26 or 27, further comprising removing sulfur compounds adsorbed to the sorbent composition and optionally any retained hydrocarbons, thereby regenerating the sorbent composition.

Embodiment 29. The process of embodiment 28, where the step of removing sulfur compounds adsorbed to the sorbent composition is performed by heating the sorbent composition to a temperature between about 100-900° C. (preferably to a temperature between about 100-450° C.) and passing air over the sorbent composition.

Embodiment 30. The process of embodiment 27, further comprising removing sulfur compounds adsorbed to the sorbent composition and optionally any retained hydrocarbons, where the step of removing sulfur compounds adsorbed to the sorbent composition is performed by heating the sorbent composition to a temperature between about 100-900° C. (preferably to a temperature between about 100-450° C.) and passing air over the sorbent composition in a direction from the top of the cartridge to the bottom of the cartridge.

Embodiment 31. The process of any of embodiments 28-30, further comprising recovering the removed sulfur compounds and optionally any hydrocarbons that are adsorbed or retained on the filter material (e.g., by collecting and condensing the removed sulfur compounds and optionally any hydrocarbons that are adsorbed or retained on the filter material).

Embodiment 32. A filtering system comprising: (a) a first sorbent composition according to any of claims 1-13 (optionally entrapped in a matrix of fibers), where the first sorbent composition preferentially adsorbs a first compound; and (b) a second sorbent composition according to any of claims 1-13, where the second sorbent composition preferentially adsorbs a second compound (e.g., where the first and second sorbent compositions are different sorbent compositions and the first and second compounds are different sulfur compounds).

Embodiment 33. The filter system of embodiment 32 contained in a cartridge.

Embodiment 34. A fuel filter assembly comprising the filtering system of embodiment 32.

EXAMPLES

The following examples are illustrative and are not intended to limit the scope of the claimed subject matter.

Example I

A 10 g sample of titanium dioxide was ground and sieved to a size of 0.8-2 mm. The particles were then heated in an oven at a temperature of 100° C. for a period of 2 hours. The particles were then cooled to room temperature placed in a stream of water saturated air for 1 hour. The resulting particles were wet with a 0.5 molar solution of silver nitrate. The volume of the impregnating solution of silver nitrate used was equivalent to the pore volume of the titanium dioxide used or less. The wet particles were then dried in a vacuum chamber for 2 hours. The particles were then further calcined in air. The temperature was gradually increased from 100° C. to 400° C. over a time period of 1 hour. The temperature was maintained at 400° C. for 2 hours.

Figure 2:
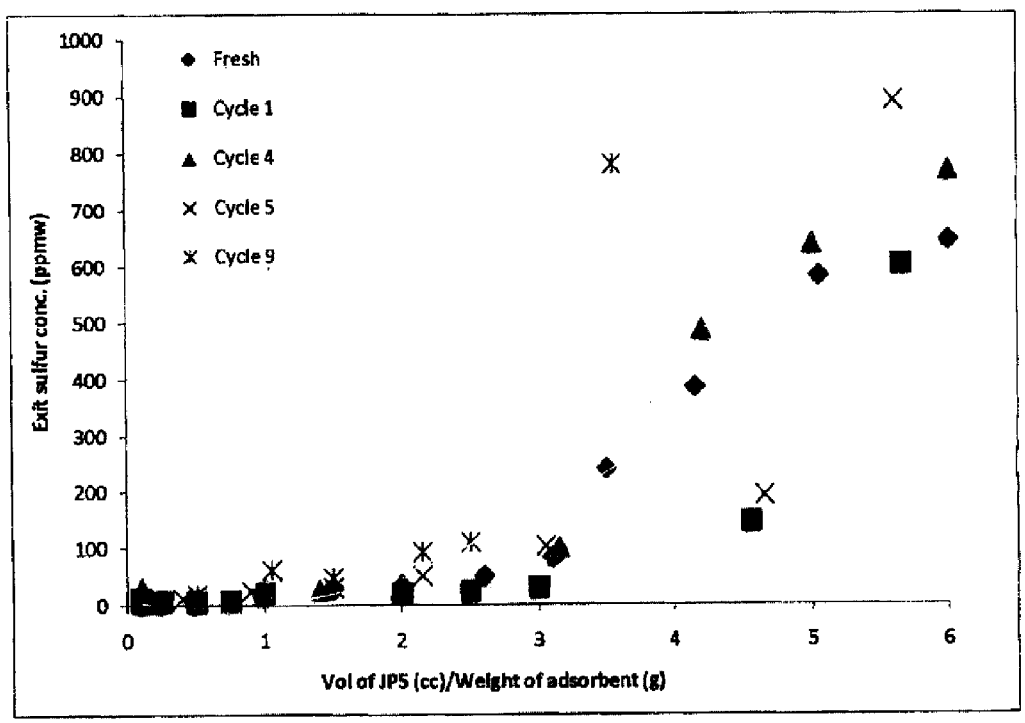
FIG. 2 illustrates the multi-cycle performance of an adsorbent bed.

The calcined particles at room temperature were then loaded into a tubular reactor supported on both ends by quartz wool. The reactor was mounted vertically. Jet fuel (JP-5) with a total sulfur content of 1172 ppmw sulfur was pumped from the bottom of the reactor at a flow rate of 0.5 cc/min. Desulfurized fuel exiting from the top of the reactor was periodically analyzed for sulfur content using a gas chromatograph equipped with a pulsed flame photometric detector. The measured sulfur concentration is shown in FIG. 2.

Optional Regeneration. After the adsorption cycle is completed the bed may be reused by heating up the bed in flowing air at an initial temperature of 220° C. and maintaining the temperature for a period of one hour. The temperature is further raised to 450° C. and maintained for another 2 hours. The stripping air is flowed in a direction opposite to that used during the adsorption cycle. The bed is used for a subsequent adsorption cycle once it attains room temperature. Sulfur concentrations at the bed outlet for 10 cycles are shown in FIG. 2.

Example II

A polishing layer may be prepared as follows. A sorbent composition is prepared as described in Example I and the resulting composition is sized in a range between about 50-100 microns. The sized particles then are embedded in a pre-form consisting of ceramic fibers and cellulose using a wet-lay process. The pre-form is then sintered in a furnace in air to give a bonded network of ceramic fibers and particles. The sintering process is carried out initially at a temperature of 400° C. for 30 minutes and then at 890° C. for another 30 minutes. The cellulose is oxidized in the process resulting in a matrix of which is 70% void, the remaining 3% is occupied by the ceramic fibers and the rest occupied by the particles.

Example III

Sintered filter media as described in Example II was prepared follows. Ceramic-cellulose composite paper pre-forms were prepared in 16 cm diameter circular sheets using a wet-lay process. The typical amounts of ceramic fibers, cellulose and particles of the composition were 6 g/sheet, 2 g/sheet and 18 g/sheet. The preform was then dried in an oven at 100° C. for 3 hours to remove the moisture. Further the paper sheet was sintered at 980° C. for 30 minutes in air. This process drives the cellulose out of the structure resulting in a mesh of bonded ceramic fibers to which the adsorbent particles are attached. The structure is primarily void (approximately 70% (and preferably at least about 50% void)). This enables the use of small particle sizes (20-150 microns) thus reducing intra-particle mass transfer resistance during sulfur adsorption and regeneration.

This structure allows for the application of a polishing filter to the packed bed, which extend the breakthrough time significantly at low concentrations. (See, e.g., FIG. 1). The procedure thus results in a smaller bed depth for a given required outlet sulfur concentration. This structure also allows for the use of small particle sizes without bringing about significant pressure drop in the system. The use of ceramic fibers that do not degrade in the presence of complex fuels such as jet fuels for entrapment allows for quick regeneration of the polishing filter along with the packed bed.

Example IV

A. Introduction

The composition of the adsorbent is a significant factor in the sulfur removal capacity. The affinity of silver for sulfur is the most prominent observation. The morphology and the oxidation state of silver are also significant. These parameters are mainly controlled by the preparative conditions. However the presence of promoting agents and silver loading on the support also brings about changes in the crystal structure of the silver species.

Optimization of the preparation procedures can result in a highly dispersed silver active species on the support structure. Steps to prevent pore blockage during impregnation of the precursor, drying and calcination procedure are to be considered.

Regenerability is a prerequisite for desulfurization compositions applied for liquid fuels due to the low sulfur removal capacities compared to compositions used for gas-phase applications. Thus single-use materials have limited practical applicability. Thus multi-cycle performance is very important. Also adaptability to operating conditions such as temperature and pressure is significant.

B. Performance

1. Performance Over Multiple Adsorption-Regeneration Cycles

Desulfurization compositions operating in the liquid phase with real fuels have very small sulfur capacity compared to gas phase adsorbents such as zinc oxide. For example, zinc oxide sorbents have a sulfur capacity of 400 mg S/g of adsorbent compared to approximately 6-10 mg S/g for the best performing liquid phase adsorbents. Thus, it becomes prohibitively expensive to develop and use single use adsorbents for liquid phase applications. However the reduced capacity for these compositions may be compensated by regenerating and reusing the adsorbent.

An adsorbent composition was tested for multi-cycle desulfurization performance. An adsorbent bed of weight 10 g was loaded into a stainless tube reactor of 6.4 cm length and 1.6 cm diameter. The adsorbent was a 2.0 wt % $Ag/TiO_2$ composition. The adsorbent bed was supported by quartz wool on either ends. JP-5 fuel with a total sulfur concentration of 1172 ppmw sulfur was pumped at a flow rate of 0.5 cc/min (LHSV=2.13 $h^{-1}$) from the bottom of the reactor as shown in FIG. 1. The sulfur concentration of the reactor output was determined using a gas chromatograph equipped with a sulfur specific pulsed flame photometric detector (PFPD). The outlet sulfur concentration was thus monitored during breakthrough till the bed was exhausted. The outlet sulfur concentration is shown in FIG. 2. At exhaustion the fuel flow is stopped. The fuel within the reactor is drained and then air at room temperature at a high flow rate of 100-500 cc/min (LHSV 15 $h^{-1}$) is passed through the bed as a blow-down procedure to remove as much hydrocarbons trapped in the bed as possible for about 15 minutes. Subsequently the reactor is heated using the furnace. The temperature is initially raised to 220° C. (at a rate of 10° C./min) and maintained for an hour.

The temperature is further increased to 450° C. (at a rate of 10° C./min) and maintained for 2 h while reducing the air flow. This is carried out to reduce the heat loss to the passing air medium. The bed may be used for a second cycle of adsorption after the system cools to room temperature. The desulfurization performance of the adsorbent bed is shown in FIG. 2.

The system was regenerated for 10 cycles as shown in FIG. 2. It may be observed that the desulfurization performance was consistent over the 10 cycles. The regenerability of the composition over 10 cycles was established.

2. Performance of Larger Beds

There are several hurdles for adapting laboratory scale systems to applications on a larger scale. Desulfurization compositions for the liquid phase are prepared in very small quantities and tested likewise. However the applications these compositions are sought for require the processing of large volumes of fuel consistently and continuously over a period of time.

An effort was thus made here to test the performance of larger beds of 20 g and 50 g of Ag/TiO$_2$ adsorbents. The test characteristics are presented in Table 1.

TABLE 1

Test conditions followed by Ag/TiO$_2$ extended bed tests

| Weight | Particle Size mm | Ag % | Flow Rate cc/min | Face velocity cm/min | LHSV h-1 | Rxr fill time min | Length cm |
|---|---|---|---|---|---|---|---|
| 10 g | 1.4-0.8 | 2.4 | 0.5 | 0.25 | 2.13 | 20 | 6.4 |
| 20 g | 1.4-0.8 | 2.4 | 0.5 | 0.25 | 1.66 | 42 | 10.7 |
| 50 g | 1.4-0.8 | 2.4 | 0.5 | 0.25 | 0.51 | 105 | 29.2 |

The silver loading was 2.4% w/w in all the tests. The JP-5 flow rate was 0.5 cc/min in all the cases; however the LHSV was 2.13, 1.66 and 0.51 for the 10, 20 and 50 g beds respectively.

Figure 3:
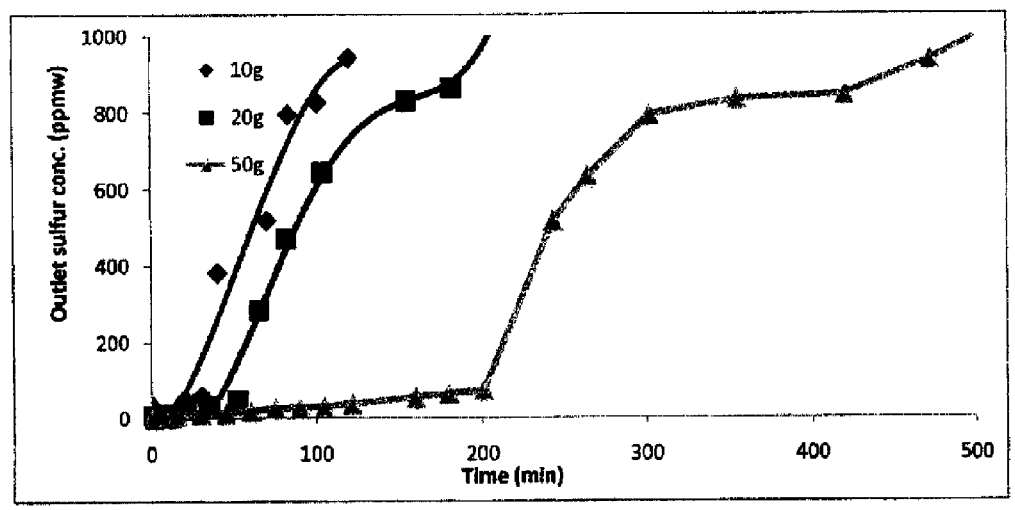
FIG. 3 illustrates the breakthrough performance of an extended bed comprising $Ag/TiO_2$ compositions.

The breakthrough performance of the 3 beds is shown in FIG. 3. The bed with the highest adsorbent loading provided low sulfur fuel for approximately 200 minutes while the smaller beds of 10 and 20 g ran for 25 and 50 minutes. Thus, it may be noted that using the present composition, larger beds provide correspondingly larger run time. This factor is critical during scale-up to larger systems.

3. Adsorbent Performance at Different Temperatures

Flexibility of the adsorptive system to ambient conditions plays a crucial role in the applicability of these systems to scaled-up systems. Most adsorbents are severely sensitive to variation in temperature towards in terms of capacity.

A mobile desulfurization unit will have to provide consistent performance in a wide temperature regime. To test the effect of temperature variation on desulfurization performance, the adsorbent was tested at various temperatures. JP-5 with total sulfur content 1172 ppmw was used in the three breakthrough tests. The adsorbent loading was 10 g and the fuel flow rate was 0.5 cc/min (LHSV 2.13 h$^{-1}$). The adsorbent bed consisted of particles of 1.4-0.85 mm, 2.3% w/w Ag supported on TiO$_2$.

The reactor was placed in a constant temperature water bath with the fuel feed pre-heated to the bath temperature prior to being introduced to the reactor. The bed temperature was monitored by a K-type thermocouple embedded in the reactor. Breakthrough data was obtained at room temperature (i.e., 22° C.), 40° C. and 60° C.

Figure 4:
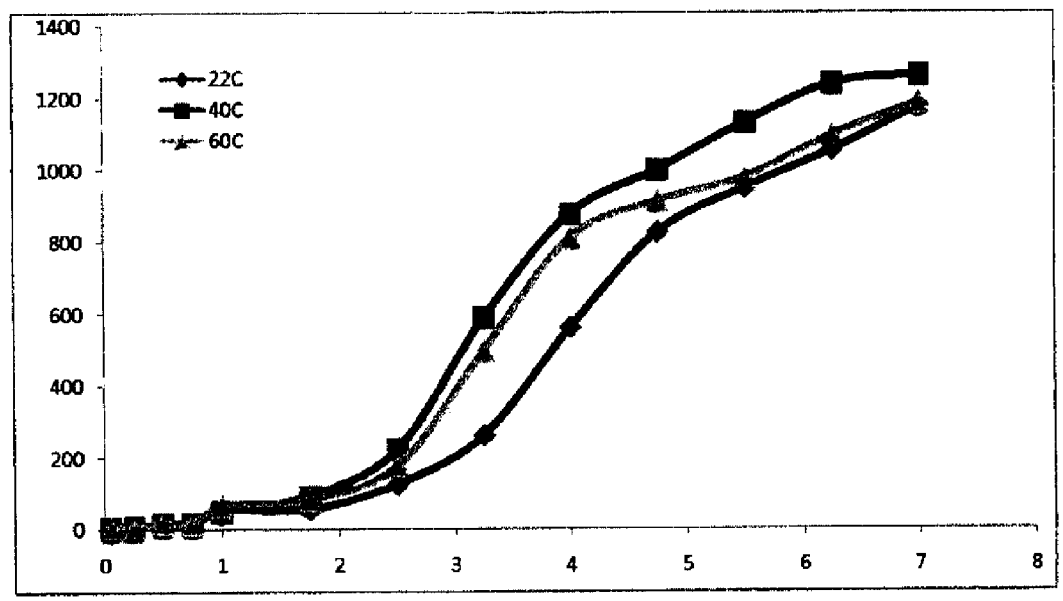
FIG. 4 illustrates the desulfurization performance at different ambient temperatures of $Ag/TiO_2$ compositions.

From FIG. 4 it may be observed that the breakthrough trend was the same in the three cases. This indicates the absence of a specific activation step in terms of sulfur removal in the temperature window investigated. Thus, it may be noted that the desulfurization performance does not vary with temperature.

4. Desulfurization Performance with Other Fuels

The composition of the fuels requiring desulfurization varies as a result of the source of crude oil from which the fuel was derived and as a result of processing conditions, especially hydrodesulfurization. The structure of the remaining sulfur species in the fuel is sometimes very different from that of the original fuel.

Figure 5:
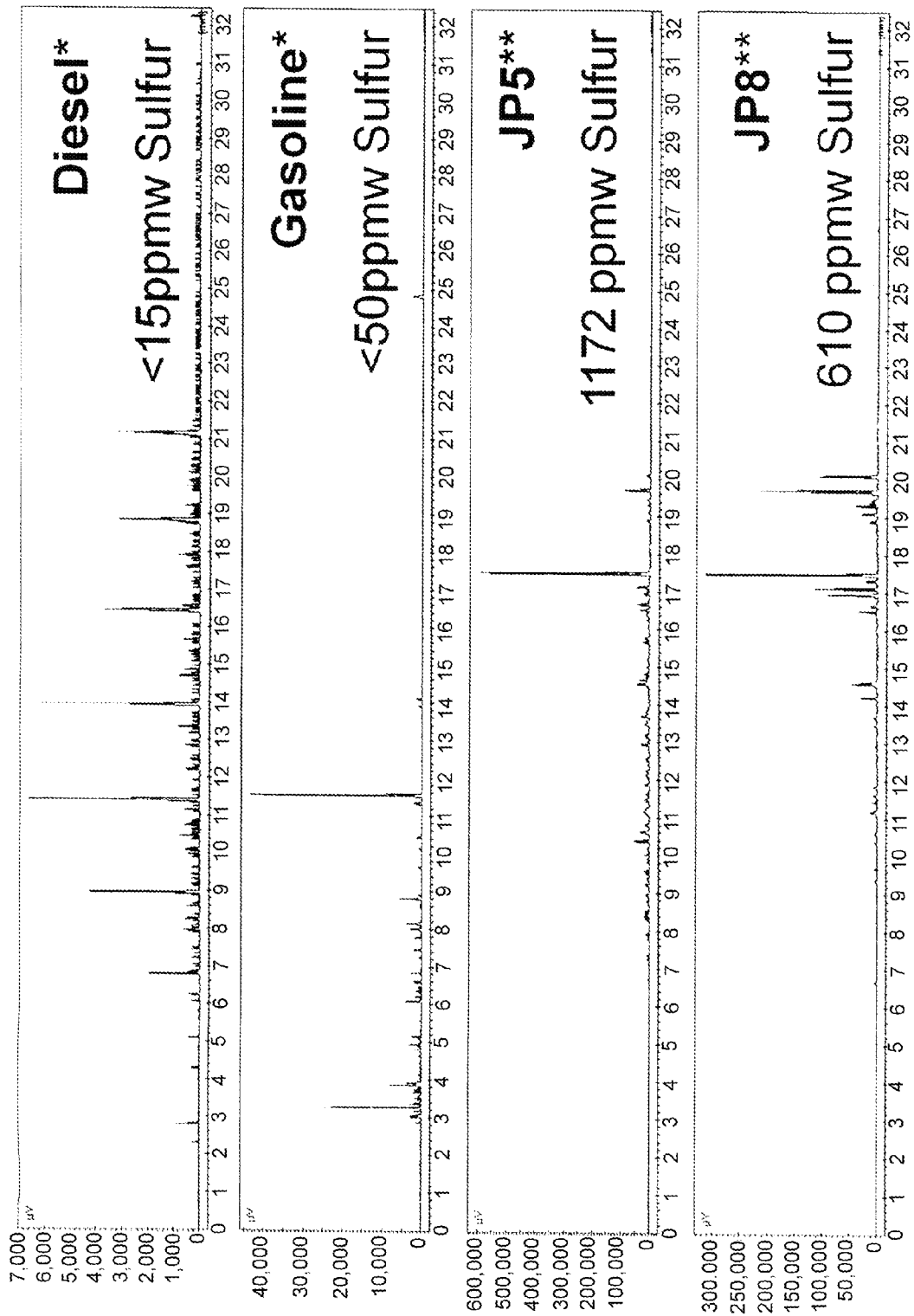
FIG. 5 provides sulfur-specific chromatograms of fuels obtained on a gas chromatograph equipped with a Pulsed Flame Photometric detector (PFPD). *Injected at a split ratio of 1:20 or **1:80.

Thus, the desulfurization efficiency may vary based on the fuel undergoing desulfurization treatment. In this study, the Ag/TiO$_2$ composition was tested for sulfur removal from four fuels including: the jet fuel grades JP-5 and JP-8, gasoline, and low sulfur diesel. The variation in sulfur speciation in these four fuels was assessed using a sulfur specific PFPD attached to a gas chromatograph. The chromatograms are shown in FIG. 5.

The gasoline and diesel were obtained from a local gas station. The diesel contained less than 15 ppmw and the gasoline less than 50 ppmw of sulfur (as indicated on the dispensing station as well as approximate quantification by gas chromatography). The JP-5 had 1172 ppmw sulfur and the JP-8 had approximately 650 ppmw sulfur.

The fuels were passed through the Ag/TiO$_2$ composition where the Ag loading was 4.0% w/w and the particles were of size 1.4-0.85 mm. The bed length was 6.4 cm and the bed diameter was 1.6 cm. The fuel flow rate in all cases was 0.5 cc/min (LHSV=2.13 h$^{-1}$) through the bed. The sulfur concentration at the bed outlet was monitored using the gas chromatograph.

Figure 6:
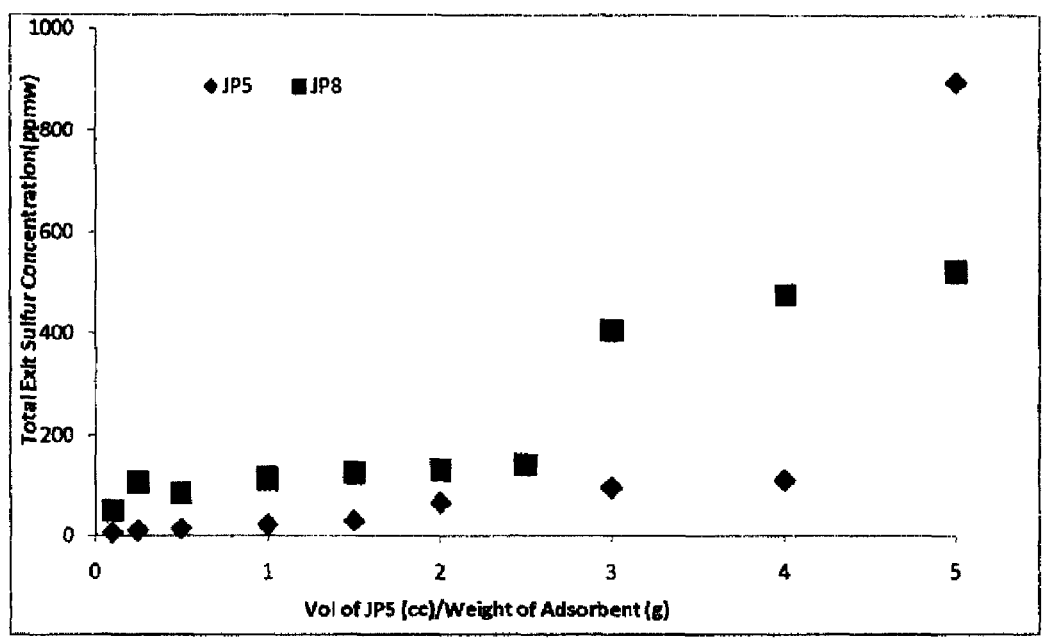
FIG. 6 illustrates the desulfurization performance of $Ag/TiO_2$ compositions on JP-5 and JP-8 jet fuels.
Figure 7:
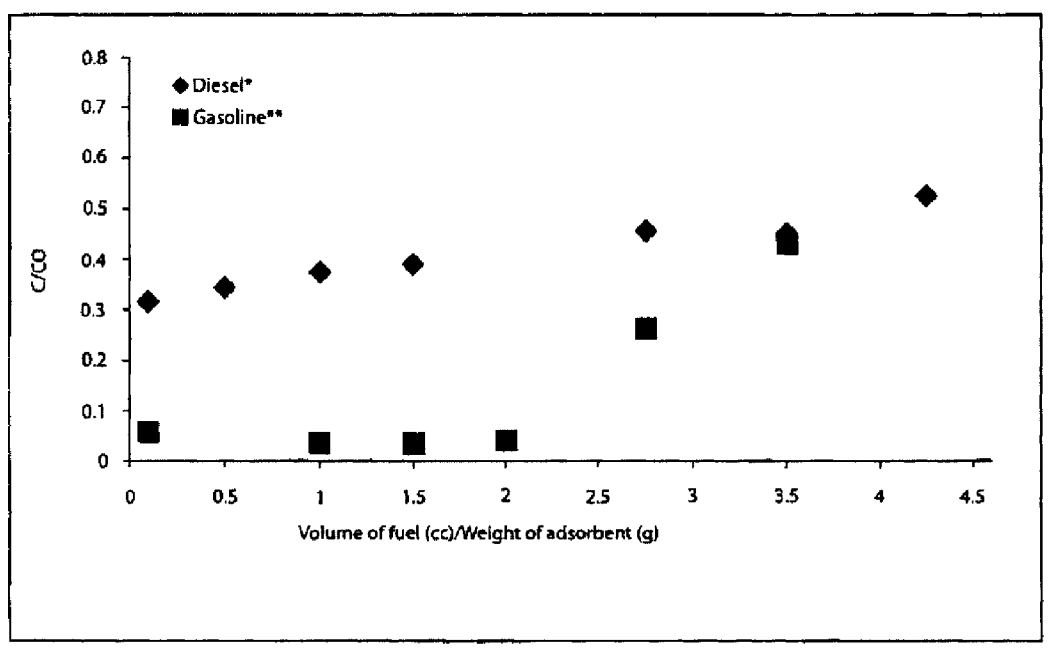
FIG. 7 illustrates the breakthrough characteristics of the $Ag/TiO_2$ compositions applied to diesel and gasoline.

FIG. 6 describes the sulfur removal performance of the composition for JP-5 and JP-8. The composition was more effective in removing sulfur from JP-5 compared to JP-8. This may be due to the aforesaid difference in sulfur content in the two fuels. However, it may be noted that desulfurization is substantial for both the fuels. FIG. 7 depicts the outlet sulfur concentration with respect to the inlet concentration (C/CO) versus the amount of fuel processed (normalized to the weight of the bed).

C. Composition

The composition of the adsorbent has a direct influence due to the varying affinity of components to sulfur in liquid fuels.

1. Effect of Silver Loading on Breakthrough Performance

Figure 8:
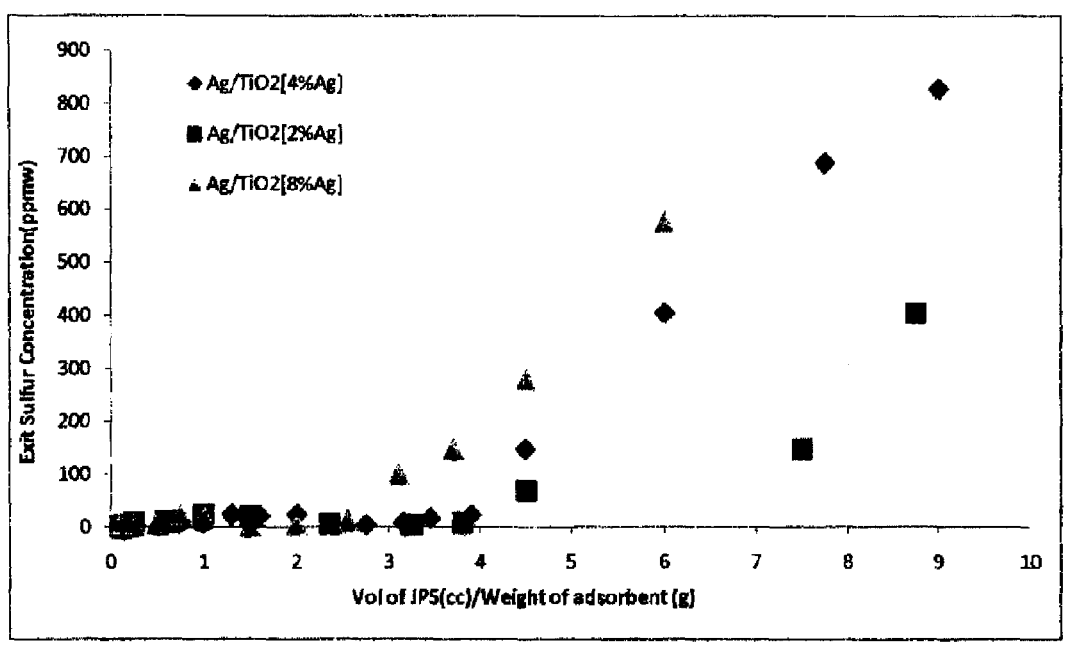
FIG. 8 illustrates the breakthrough performance of the $Ag/TiO_2$ compositions with varying Ag loading.

The effect of silver loading in the sorbent compositions was assessed. Breakthrough experiments were carried out by pumping JP-5 fuel with a total sulfur content of 1172 ppmw sulfur from the bottom of an adsorbent bed of 10 g weight through the top of the bed. The JP-5 flow rate was 0.5 cc/min (LHSV=2.13 h$^{-1}$). The bed length was 6.4 cm and diameter was 1.6 cm. The particle size was between 1.4-0.85 mm. The breakthrough performance of the beds with 2, 4 and 8 wt. % Ag is shown in FIG. 8. The breakthrough and saturation capacities are listed in Table 2.

TABLE 2

Sulfur capacities with varying silver loading on the support

| Silver Loading | Breakthrough Sulfur Capacity @20 ppmw | | Saturation Capacity based on t$_{1/2}$ | | Atomic silver utilization % |
|---|---|---|---|---|---|
| | mg/g | mg/cc | mg/g | mg/cc | |
| 2% | 3.20 | 2.51 | 8.4 | 5.9 | 98 |
| 4% | 3.62 | 2.79 | 6.3 | 4.6 | 27 |
| 8% | 2.92 | 1.83 | 5.6 | 4.3 | 10 |

The highest sulfur removal capacity was shown by the composition with 2.0% w/w silver. (See Table 2). Sulfur capacities were lower for 4.0% and 8.0% w/w silver loadings. If one sulfur atom is considered to be captured by two silver atoms, then the 2.0% loading demonstrated that 98% of the silver atoms were used to capture sulfur. This is an extremely efficient atomic utilization of the active species considering the fact that this performance was demonstrated with real (JP-5) fuel. Thus, much higher sulfur capacities are viable if the silver atomic utilization can be increased at higher loadings.

2. Effect of Promoters on Desulfurization Performance of Ag/TiO$_2$ Systems

Promoters are used to enhance the activity of catalytic materials. Several atoms were tested as promoters with the Ag/TiO$_2$ system to check for enhancement in performance.

The breakthrough was studied using JP-5 with a total sulfur content of 1172 ppmw sulfur. The adsorbent particle size was between 1.4 and 0.85 mm. The bed was of length 6.4 cm and 1.6 cm in diameter. The composition of the adsorbents used is listed in Table 3.

TABLE 3

Composition of the promoted Ag/TiO$_2$ desulfurization adsorbent.

| Dopant | Silver Wt % | Dopant Wt % | Breakthrough capacity @20 ppmw [mgS/g] | Saturation capacity from $t_{1/2}$ point |
|---|---|---|---|---|
| Cu | 7.9 | 1.25 | 0.92 | 6.5 |
| Ni | 7.9 | 1.16 | 0.92 | 4.1 |
| Ce | 7.9 | 2.72 | 0.55 | 6.4 |
| La | 7.9 | 2.71 | 0 | 3.5 |
| Co | 7.9 | 1.16 | 0.92 | 5.0 |

Figure 9:
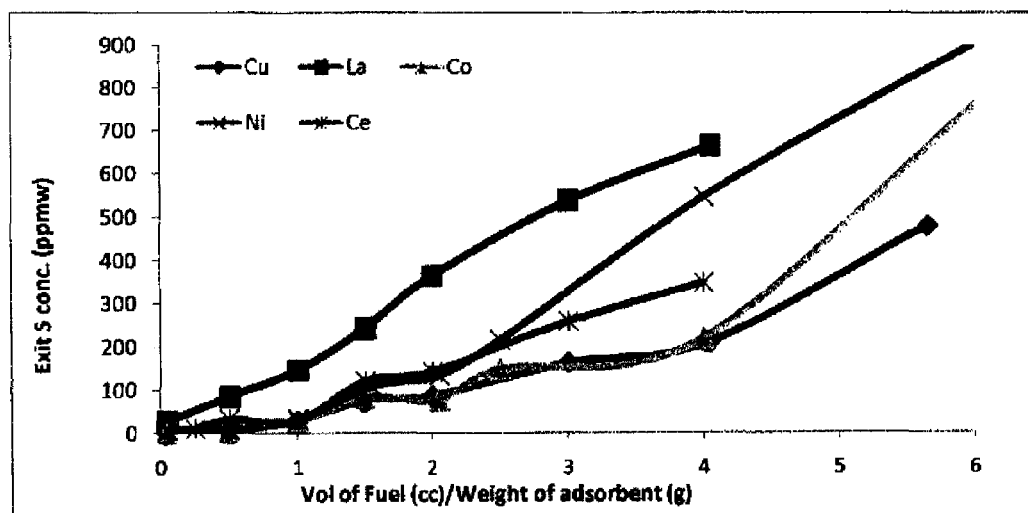
FIG. 9 illustrates the breakthrough performance of promoted $Ag/TiO_2$ compositions.

JP-5 fuel was flowed at a rate of 0.5 cc/min (LHSV=2.13 h$^{-1}$) from bottom to the top of the bed. The sulfur concentration of the bed output was monitored. (See FIG. 9).

D. Preparative Procedures

1. Calcination Temperature

Calcination is an important step in the processing of adsorbent compositions. Several parameters were tested for calcination of the Ag/TiO$_2$ composition to determine optimum conditions. Higher temperatures result in the sintering of the silver crystallites. Sintering causes an increase in crystal dimensions which results in lower dispersions, which in turn may reduce the sulfur capacity. Thus, calcination and regeneration at lower temperatures may be preferred during preparative steps. However, because the composition is exposed to oxidizing environments during the regeneration cycles, the benefits gained from lowering the calcination temperature may be realized only for fresh adsorbent.

Figure 10:
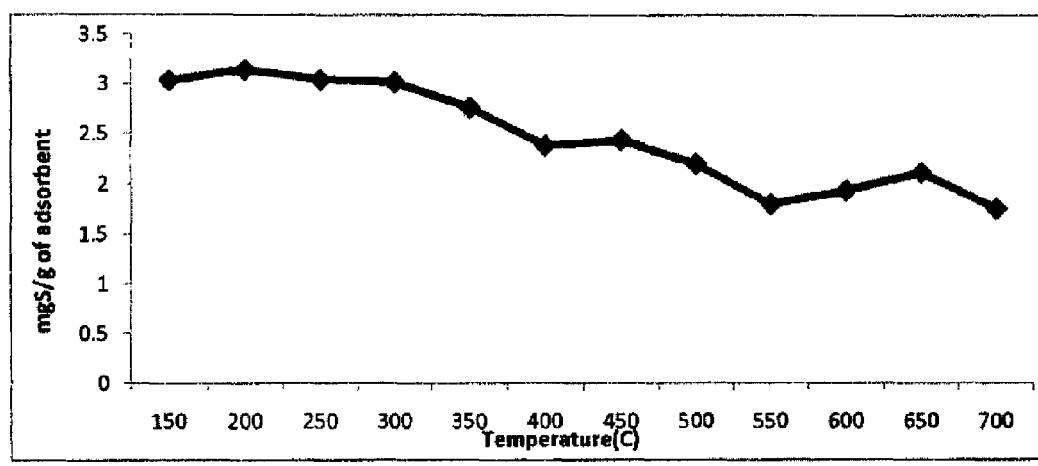
FIG. 10 illustrates the effect of calcination temperature on the desulfurization temperature.

Calcination temperature was varied from 150-700° C. and the equilibrium saturation sulfur capacity was measured for the system. The saturation capacity was measured by treating 1 g of the adsorbent with 3.2 g of JP-5 and then mechanically agitating the mixture for a time period of 48 h. The sulfur content of the remaining fuel was analyzed thus determining the amount of sulfur removed from the original fuel. The effect of calcination temperature on desulfurization performance is shown in FIG. 10. It may be noted that lower calcination temperatures provided sorbent compositions having a better capacity for sulfur (e.g., using calcination temperatures of less than about 400° C. or 450° C.), even though higher temperatures may ensure a more rapid or efficient decomposition of the precursor silver nitrate to silver and silver oxide.

2. Moisture During Impregnation

Figure 11:
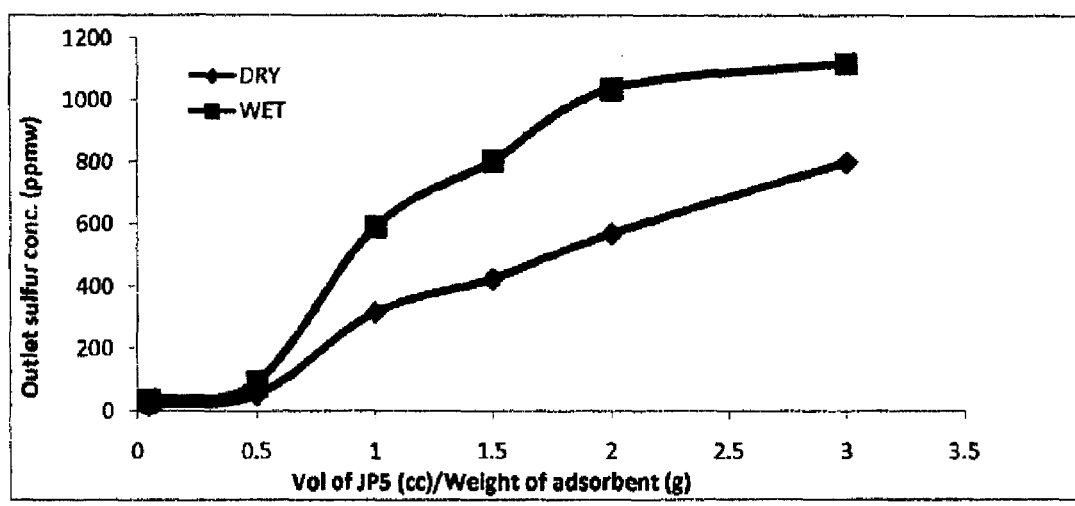
FIG. 11 illustrates the effect of moisture during calcination of $Ag/TiO_2$ compositions on desulfurization performance.

It is a common practice in catalysis and adsorbent preparation to use moisture saturated air to carry out calcination. The nitrous gases generated as a result of decomposition of the nitrate precursor is removed from the system as nitric acid. The effect of moisture during calcination on the desulfurization was investigated here. The breakthrough performance of the adsorbent calcined in flowing dry air and in moisture saturated air is shown in FIG. 11.

The breakthrough was studied using JP-5 with a total sulfur content of 1172 ppmw sulfur. The adsorbent particle size was between 1.4 and 0.85 mm. The bed was of length 6.4 cm and 1.6 cm in diameter. JP-5 fuel was flowed at a rate of 0.5 cc/min (LHSV=2.13 h$^{-1}$) from bottom to the top of the bed. The sulfur concentration of the bed output was monitored and is shown in FIG. 11. It may be noted that the adsorbent calcined in the absence of moisture showed better desulfurization performance.

3. Effect of Impregnation Volume on Desulfurization Performance

Figure 12:
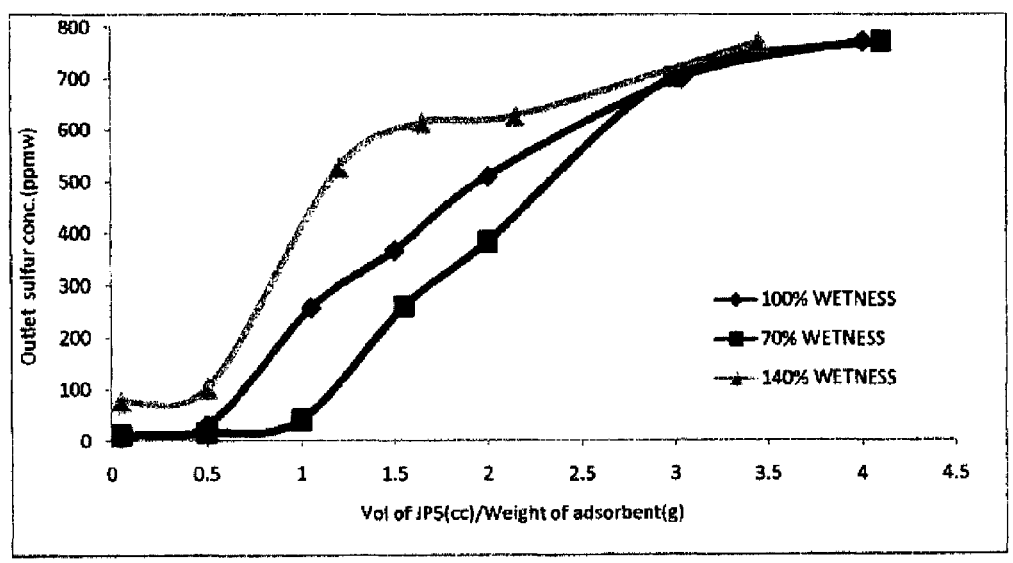
FIG. 12 illustrates the effect of impregnation precursor volume (wetness) on desulfurization performance.

During the introduction of the silver precursor to the titanium dioxide support through wetness impregnation, the volume of the impregnating solution used affects the desulfurization performance of the resulting adsorbent. Preferably, the impregnating volume is equal to or less than the pore volume of the support. The incipient wetness technique is carried out using precursor volumes very close to 100% of the pore volume of the support. Supported catalysts are also prepared by techniques of vacuum impregnation and soaking support materials in the precursor solution. the percentage of pore volume of the support that is impregnated with the precursor is identified as the wetness percentage, represented as:

$$\% \text{ Wetness} = \frac{\text{Volume of impregnating precursor solution}}{\text{Pore volume of the support}} \times 100$$

then the present composition gives its optimum performance when the wetness is less than or equal to a 100%. The desulfurization performance of three batches of Ag/TiO$_2$ adsorbent was observed with wetness at 70, 100 and 140%. JP-5 fuel with a total sulfur concentration of 1172 ppmw sulfur was the fuel used in the three cases. The adsorbent particle size was between 1.4 and 0.85 mm. The bed was of length 6.4 cm and 1.6 cm in diameter. JP-5 fuel was flowed at a rate of 0.5 cc/min (LHSV=2.13 h$^{-1}$) from bottom to the top of the bed. The bed sulfur concentration of the bed output was monitored and is shown in FIG. 12. The adsorbent prepared at 70% wetness showed the highest capacity for sulfur. Thus, lower wetness numbers show better desulfurization performance, and it may be preferably to prepare the sorbent compositions using a volume of impregnating solution that is no more than the pore volume for the support (e.g., a volume of impregnating solution that is no more than 100%, 90%, 80%, or 70% of the pore volume for the support).

4. Vacuum Drying

Figure 13:
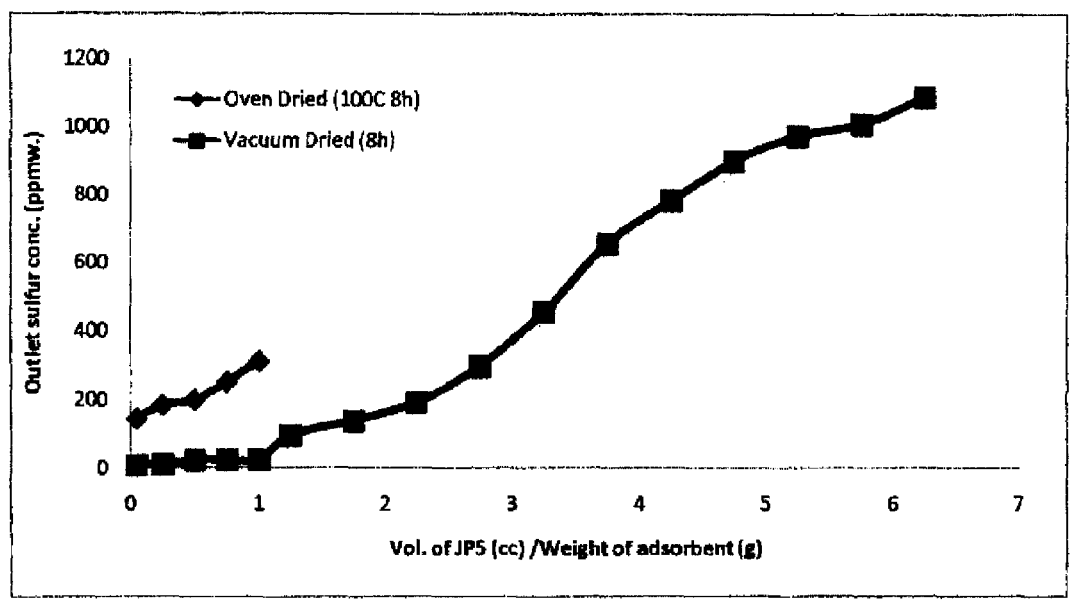
FIG. 13 illustrates desulfurization performance of vacuum-dried and oven-dried $Ag/TiO_2$ compositions.

Some of the variables that control the dispersion of active silver species on the support are drying temperature, pressure and the rate of drying. Vacuum drying has been used in the food industry extensively due to its ability to remove moisture with no heat applied. The same technique was used to dry the Ag/TiO$_2$ after impregnating with the precursor solution. A vacuum was applied to the wet particles for selected periods of time. The applied vacuum was 50 m Torr which provided a drying rate of 0.05 cc/min. The particles then were calcined at 400° C. for 2 h in air. Approximate silver loading was 2.3% w/w. The particle size was 1.4-0.85 mm. The desulfurization performance of the vacuum-dried adsorbent was compared to an oven-dried sample (which had been dried at 110° C. for 8 h prior to calcination). (See FIG. 13).

JP-5 fuel with a total sulfur concentration of 1172 ppmw sulfur was the fuel in both the cases. The adsorbent particle size was between 1.4 and 0.85 mm. The bed was of length 6.4 cm and 1.6 cm in diameter. JP-5 fuel was flowed at a rate of 0.5 cc/min (LHSV=2.13 h$^{-1}$) from the bottom to the top of the bed. A significant improvement in sulfur removal capacity was observed from the vacuum-dried composition versus the oven-dried composition.

All publications and patent applications cited in this specification are herein incorporated by reference as if each individual publication or patent application were specifically and individually indicated to be incorporated by reference.

We claim:

1. A process for removing sulfur compounds from a hydrocarbon stream, the process comprising passing the hydrocarbon stream through an effective amount of a sorbent composition for a sufficient period of time to reduce sulfur compounds in the hydrocarbon stream to a level of no more than about 1 ppmw, the sorbent composition comprising porous titanium dioxide particles impregnated with a silver material, wherein the impregnated particles comprise about 97-99.9% titanium dioxide (w/w) and about 0.1-3% silver material (w/w).

2. The process of claim 1, wherein the sorbent composition is contained within a cartridge having a bottom and a top and the hydrocarbon stream passes from the bottom of the cartridge to the top of the cartridge.

3. The process of claim 2, further comprising removing sulfur compounds adsorbed to the sorbent composition and any retained hydrocarbons.

4. The process of claim 3, wherein the step of removing sulfur compounds adsorbed to the sorbent composition and any retained hydrocarbons is performed by heating the sorbent composition to a temperature between about 100-900° C. and passing an oxidizing agent over the sorbent composition.

5. The process of claim 3, further comprising recovering the removed sulfur compounds and any retained hydrocarbons through condensation.

6. The process of claim 2, further comprising removing sulfur compounds adsorbed to the sorbent composition and any retained hydrocarbons by heating the sorbent composition to a temperature between about 100-900° C. and passing air over the sorbent composition in a direction from the top of the cartridge to the bottom of the cartridge.

7. The process of claim 1, wherein the silver material is selected from a group consisting of silver metal, silver oxide, silver salt, and mixtures thereof.

8. The process of claim 1, wherein the silver material is silver metal, silver oxide, or a mixture thereof.

9. The process of claim 1, wherein the silver material is in a nanocrystallite form.

10. The process of claim 1, wherein the particles have a pore volume of about 0.1-3.0 cc/g.

11. The process of claim 1, wherein the particles have a surface area of about 100-1000 $m^2/g$.

12. The process of claim 1, wherein the particles have an average diameter of about 30-6000 microns.

13. The process of claim 1, wherein the particles have an average diameter of about 20-250 microns.

14. The process of claim 1, wherein the particles have an average pore diameter of about 1-20 nm.

15. The process of claim 1, wherein the particles are in the form of powder, grains, pellets, extrudates, or combinations thereof.

16. The process of claim 1, wherein the sorbent composition is dispersed on a support material selected from a group consisting of silicon dioxide, aluminum oxide, and activated carbon.

17. A process for removing sulfur compounds from a hydrocarbon stream, the process comprising passing the hydrocarbon stream through an effective amount of a sorbent composition for a sufficient period of time to reduce sulfur compounds in the hydrocarbon stream to a level of no more than about 1 ppmw, the sorbent composition comprising porous titanium dioxide particles impregnated with a silver material, wherein the impregnated particles comprise about 95-99.9% titanium dioxide (w/w) and about 0.1-5% silver material (w/w), wherein the silver material comprises a dopant selected from a Group VIII metal or an oxide thereof and the weight ratio of silver material to dopant in the sorbent composition is about (7-3):1.

18. The process of claim 17, further comprising removing sulfur compounds adsorbed to the sorbent composition and any retained hydrocarbons.

19. The process of claim 17, wherein the sorbent composition comprises about 97-99.9% titanium dioxide (w/w) and about 0.1-3% silver material (w/w).

20. The process of claim 17, wherein the silver material is in a nanocrystallite form.

21. The process of claim 17, wherein the particles have a pore volume of about 0.1-3.0 cc/g, the particles have a surface area of about 100-1000 $m^2/g$, and the particles have an average diameter of about 20-250 micron.

* * * * *